(12) United States Patent
Agiwal et al.

(10) Patent No.: US 10,531,496 B2
(45) Date of Patent: *Jan. 7, 2020

(54) APPARATUS AND METHOD FOR SIGNALING SYSTEM INFORMATION

(71) Applicant: Samsung Electronics Co., Ltd., Suwon-si, Gyeonggi-do (KR)

(72) Inventors: Anil Agiwal, Suwon-si (KR); Youngbin Chang, Anyang-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/229,974

(22) Filed: Dec. 21, 2018

(65) Prior Publication Data

US 2019/0132884 A1    May 2, 2019

Related U.S. Application Data

(63) Continuation of application No. 15/443,307, filed on Feb. 27, 2017, now Pat. No. 10,455,621.

(Continued)

(51) Int. Cl.
  *H04L 12/18*     (2006.01)
  *H04W 74/08*    (2009.01)
  (Continued)

(52) U.S. Cl.
  CPC ......... *H04W 74/0833* (2013.01); *H04W 4/06* (2013.01); *H04W 48/12* (2013.01);
  (Continued)

(58) Field of Classification Search
  None
  See application file for complete search history.

(56) References Cited

U.S. PATENT DOCUMENTS 9,635,652 B2* 4/2017 Wu .................. H04W 72/0473
9,716,988 B2* 7/2017 Vos .......................... H04W 4/70
(Continued)

FOREIGN PATENT DOCUMENTS

WO   2014-206311 A1   12/2014
WO   2015-113384 A1   8/2015

OTHER PUBLICATIONS

Extended European Search Report dated Jan. 4, 2019, issued in a counterpart European application No. 17760267.9-1215/3409048.

(Continued)

*Primary Examiner* — Sithu Ko
(74) *Attorney, Agent, or Firm* — Jefferson IP Law, LLP

(57) ABSTRACT

The present disclosure relates to a communication method and system for converging a $5^{th}$-generation (5G) communication system for supporting higher data rates beyond a $4^{th}$-generation (4G) system with a technology for internet of things (IoT). The present disclosure may be applied to intelligent services based on the 5G communication technology and the IoT-related technology, such as smart home, smart building, smart city, smart car, connected car, health care, digital education, smart retail, security and safety services. A method for receiving system information (SI) by a user equipment (UE) in a wireless communication system is provided. The method includes receiving, from a base station (BS), first type SI associated with SI which is essential for communication with the BS, transmitting, to the BS, a physical random access channel (PRACH) preamble based on the first type SI, receiving, from the BS, a random access response (RAR) message, and receiving, from the BS, second type SI associated with at least one SI which the UE needs.

18 Claims, 20 Drawing Sheets

Related U.S. Application Data

(60) Provisional application No. 62/301,016, filed on Feb. 29, 2016, provisional application No. 62/334,706, filed on May 11, 2016.

(51) Int. Cl.
*H04W 48/12* (2009.01)
*H04W 4/06* (2009.01)
*H04W 72/04* (2009.01)
*H04W 72/14* (2009.01)
*H04W 74/00* (2009.01)

(52) U.S. Cl.
CPC ....... *H04W 72/0413* (2013.01); *H04W 72/14* (2013.01); *H04W 74/006* (2013.01)

(56) References Cited

U.S. PATENT DOCUMENTS

| | | | | |
|---|---|---|---|---|
| 9,730,114 | B2* | 8/2017 | Han | H04W 36/0016 |
| 10,080,243 | B2* | 9/2018 | Su | H04J 11/00 |
| 10,306,680 | B2* | 5/2019 | Stern-Berkowitz | ............ H04W 74/0833 |
| 10,383,151 | B2* | 8/2019 | Chatterjee | H04W 74/0833 |
| 10,420,066 | B2* | 9/2019 | Sadeghi | H04L 5/005 |
| 2010/0027466 | A1* | 2/2010 | Mustapha | H04W 48/14 370/328 |
| 2010/0093386 | A1* | 4/2010 | Damnjanovic | H04W 52/04 455/522 |
| 2012/0106460 | A1* | 5/2012 | Yang | H04L 5/001 370/328 |
| 2015/0085689 | A1 | 3/2015 | Vos | |
| 2015/0181624 | A1 | 6/2015 | Hwang et al. | |
| 2015/0305065 | A1 | 10/2015 | Bai et al. | |
| 2015/0382284 | A1* | 12/2015 | Brismar | H04W 74/04 370/329 |
| 2016/0150570 | A1 | 5/2016 | Wang et al. | |
| 2016/0234735 | A1* | 8/2016 | Kubota | H04W 48/14 |
| 2016/0345325 | A1 | 11/2016 | Liu et al. | |
| 2017/0265165 | A1 | 9/2017 | Li et al. | |

OTHER PUBLICATIONS

NEC: Further clarification of on-demand S-BCH 3GPP Draft; R2-063090; LTE BCH-On-Demand Clarification, 3rd Generation Partnership Project (3GPP), Mobile Competence Centre; 650, Route Des Lucioles; F-06921 Sophiaantipolis Cedex; France, vol. RAN WG2, No. Riga, Latvia; Nov. 1, 2006, Nov. 1, 2006, XP050132601.

NEC: "LTE BCH-on-demand", 3GPP Draft; R2-062930; LTE BCH on Demand, 3rd Generation Partnership Project (3GPP), Mobile Competence Centre ; 650, Route Des Lucioles ; F-06921 Sophia-Antipolis Cedex; France, vol. RAN WG2, No. Seoul, Korea; Oct. 5, 2006, Oct. 5, 2006, XP050132448.

NORTEL: "System Information broadcast gating", 3GPP; Draft; R2-063137, 3rd Generation Partnership Project (3GPP), Mobilecompetence Centre ; 650, Route; Deslucioles ; F-06921 Sophia-Antipolis Cedex; France, vol. RAN WG2, No. Riga, Latvia; Nov. 1, 2006, Nov. 1, 2006, XP050132644.

\* cited by examiner

FIG. 13
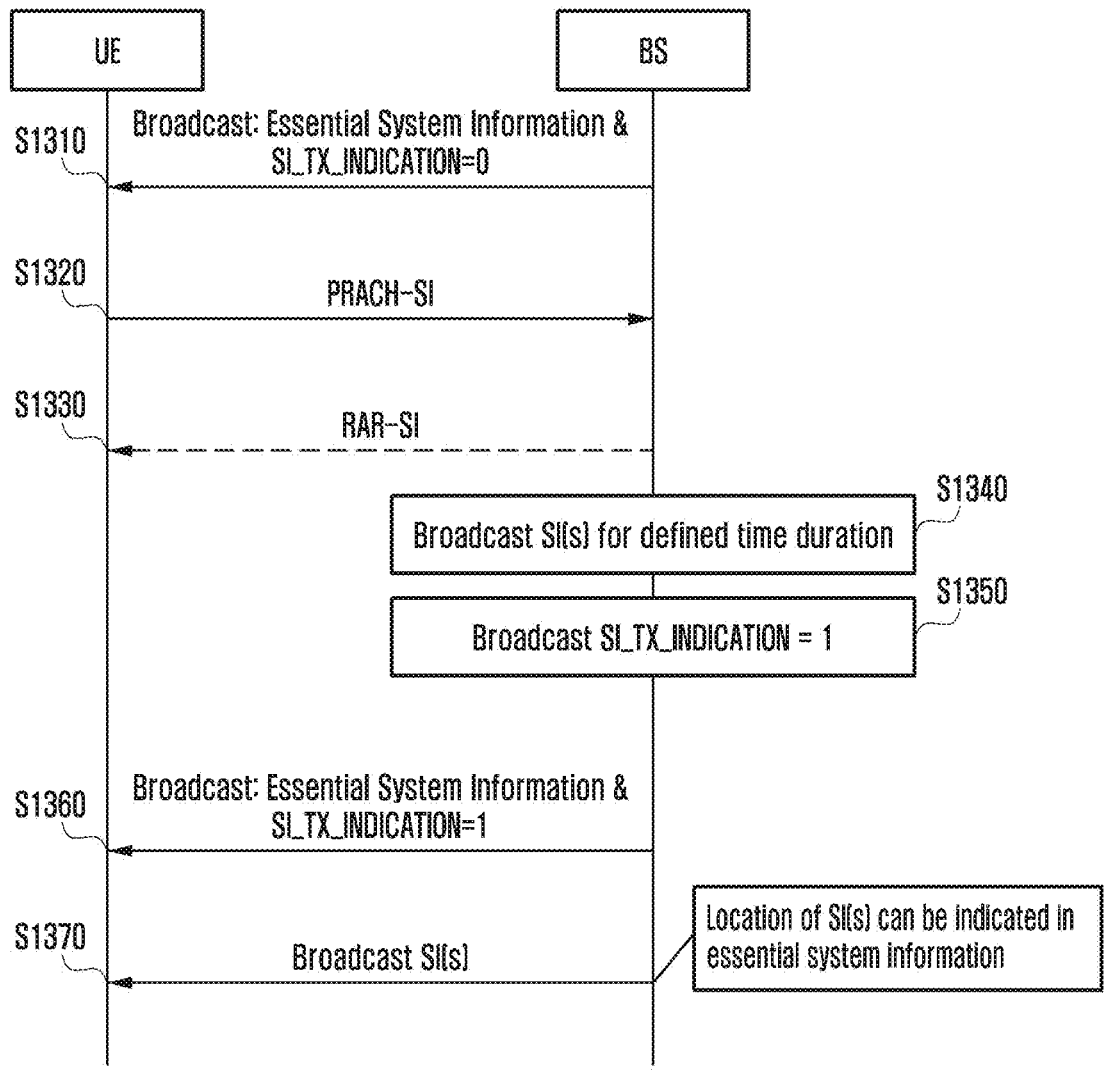
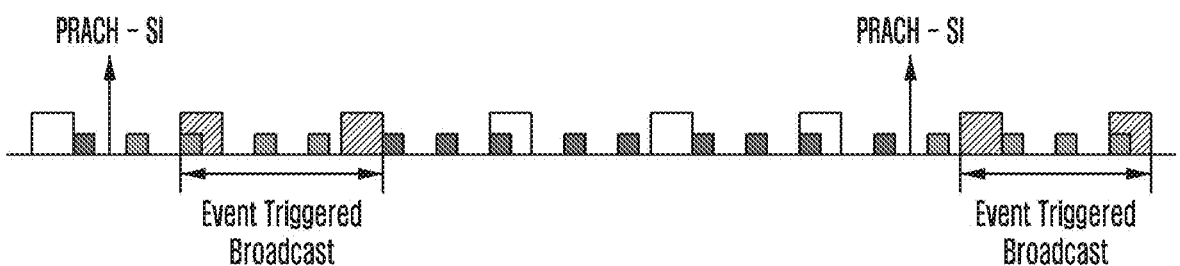

APPARATUS AND METHOD FOR SIGNALING SYSTEM INFORMATION

CROSS-REFERENCE TO RELATED APPLICATION(S)

This application is a continuation application of prior application Ser. No. 15/443,307, filed on Feb. 27, 2017, which was based on and claimed priority under 35 U.S.C. § 119(e) of a U.S. Provisional application Ser. No. 62/301,016, filed on Feb. 29, 2016, in the U.S. Patent and Trademark Office, and of a U.S. Provisional application Ser. No. 62/334,706, filed on May 11, 2016, in the U.S. Patent and Trademark Office, the disclosure of each of which is incorporated by reference herein in its entirety.

TECHNICAL FIELD

The present disclosure relates to a wireless communication system. More particularly, the present disclosure relates to an apparatus and method for transmitting and receiving system information.

BACKGROUND

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift key (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

In the recent years, several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service.

In recent years, the fourth wireless communication system has been developed to provide high-speed data service. However, currently, the fourth generation wireless communication system suffers from lack of resources to meet the growing demand for high speed data services. So fifth generation wireless communication system is being developed to meet the growing demand for high speed data services, support ultra-reliability and low latency applications and support massive machine type communication.

In the fourth generation wireless communication system, enhanced node B (eNB) or base station (BS) in cell broadcast system information. System information is structured into master information block (MIB) and a set of system information blocks (SIBs). MIB consists of system frame number (SFN), downlink system bandwidth and physical hybrid automatic repeat request (ARQ) feedback indicator channel (PHICH) configuration. An MIB is transmitted every 40 ms. It is repeated every 10 ms wherein the first transmission occurs in subframe #0 when SFM mod 4 equals zero. MIB is transmitted on physical broadcast channel. SIB Type 1 carries cell indemnity, tracking area code, cell barring information, value tag (common for all scheduling units), and scheduling information of other SIBs. SIB 1 is transmitted every 80 ms in subframe #5 when SFN mod 8 equals zero. SIB 1 is repeated in subframe #5 when SFN mod 2 equals zero. SIB 1 is transmitted on Physical downlink shared channel. Other SIBs (SIB 2 to SIB 19) are transmitted in system information (SI) message wherein scheduling info of these SIBs are indicated in SIB 1. SIBs having same periodicity can be transmitted in one SI message. SI message is broadcasted on Physical downlink shared channel. Various SIBs, their usage and typical size is indicated in Table 1 below.

TABLE 1

System Information in 4G System

| SIB Type | Content | SIB Size |
|---|---|---|
| SIB 1 | Cell ID, value tag & Scheduling info | ~500 bits |
| SIB 2 | AC-Barring, RACH Info | 2216 bits (Max) |
| SIB 3 | Common Cell reselection info & intra frequency cell reselection parameters | ~100 bits |

TABLE 1-continued

System Information in 4G System

| SIB Type | Content | SIB Size |
|---|---|---|
| SIB 4 | Intra frequency neighbor cell info | ~750 bits |
| SIB 5 | Inter frequency cell reselection information | ~1000 bits |
| SIB 6 | UTRA cell reselection information | ~1000 bits |
| SIB 7 | GERAN cell reselection information | ~1000 bits |
| SIB 8 | CDMA 2000 cell reselection information | 2216 bits (Max) |
| SIB 9 | Home eNB Info | ~56 bits |
| SIB 10 | ETWS Primary Notification | 2216 bits (Max) |
| SIB 11 | ETWS Secondary Notification | 2216 bits (Max) |
| SIB 12 | CMAS Notification | 2216 bits (Max) |
| SIB 13 | MBMS Information to acquire MBMS Control information | ~300 bits |
| SIB 14 | Extended Access Class Barring Information | ~100 bits |
| SIB 15 | MBMS Service Area Identifiers of the current and neighboring frequencies | 2216 bits (Max) |
| SIB 16 | UTC Time | ~60 bits |
| SIB 17 | Information for traffic steering between E-UTRAN and WLAN | 2216 bits (Max) |
| SIB 18 | Intra Frequency D2D Communication Information | 2216 bits (Max) |
| SIB 19 | Intra/inter frequency D2D Discovery Information | 2216 bits (Max) |

User equipment (UE) acquires the system information at cell selection, cell reselection, after handover completion, after entering evolved UMTS terrestrial radio access (E-UTRA) from another radio access technology (RAT), upon re-entering service area, upon receiving a notification (paging), and upon exceeding the maximum validity duration (3 hour).

In radio resource control (RRC) idle state, UE needs to acquire MIB, SIB 1, SIB 2 to SIB 5, SIB 6 to SIB 8 (depending on RAT supported), SIB 17 (if LTE-wireless local area network (WLAN) interworking (IWK) is supported), and SIB 18 to SIB 19 (if D2D is supported). In RRC connected state, UE needs to acquire MIB, SIB 1, SIB 2, SIB 8 (depending on RAT supported), SIB 17 (if LTE-WLAN IWK is supported), and SIB 18 to SIB 19 (if D2D is supported). System information acquired and stored is considered invalid of if value tag in received SIB 1 is different from the one in stored SI.

System information can be changed and is notified as follows: Change is notified through paging message (in RRC_IDLE or RRC_CONNECTED) with cause systemInfoModification to let UE know that some SI is changing in the next modification period. Modification period boundaries are in terms of SFN such that SFN mod modificationPeriod=0. Change of SI occurs at specific radio frames. Notification of changes in modification period N will be reflected in N+1. SIB 1 also carries value tag to indicate change in SI. UE finds the change in SI by looking at value tag in SIB 1 at the end modificationPeriod (if missed checking page) or receiving paging with systeminfoModification.

The above information is presented as background information only to assist with an understanding of the present disclosure. No determination has been made, and no assertion is made, as to whether any of the above might be applicable as prior art with regard to the present disclosure.

SUMMARY

Technical Problem

One of the issues in current method of transmitting system information using the master information block (MIB)/system information blocks (SIBs) is that MIB/SIBs are periodically broadcasted irrespective of whether a user equipment (UE) is there in cell or not; whether any UE in cell needs that information. In case of small cell deployment, broadcasting all these SIBs periodically is unnecessary and leads to significant wastage of resources and increased energy consumption.

Next Generation communication system is considering carrier frequency ranges up to 100 GHz. At higher frequencies, beamforming is essential to compensate for path loss. One transmission beam cannot provide the full cell coverage. Multiple transmission beams are needed. In order to broadcast the system information, system information needs to be transmitted using multiple transmission beams by switching a transmission (TX) beam across multiple time slots. Overhead (time/frequency resources) of transmission of system information using beamforming is N times more than transmission of system information without beamforming where 'N' is the number of transmission beams. The transmission resources remaining after resources consumed for transmission of system information may be used for data scheduling for a user in the direction of the downlink (DL) transmission beam. Therefore, if more time/frequency resources are consumed for transmission system information then user data scheduling becomes restrictive and inflexible.

Additionally UE has to reacquire the system information when it moves from one cell to another cell. This leads to increased power consumption for mobile UEs. So an enhanced method of signaling system information is needed.

Technical Solution

Aspects of the present disclosure are to address at least the above-mentioned problems and/or disadvantages and to provide at least the advantages described below. Accordingly, an aspect of the present disclosure is to provide a method for receiving system information (SI) by a UE in a wireless communication system. The method includes receiving, from a base station (BS), first type SI associated with SI which is essential for communication with the BS, transmitting, to the BS, a physical random access channel (PRACH) preamble based on the first type SI, receiving, from the BS, a random access response (RAR) message, and receiving, from the BS, second type SI associated with at least one SI which the UE needs.

In accordance with an aspect of the present disclosure, a method for transmitting system information (SI) by a base station (BS) in a wireless communication system is provided. The method includes transmitting, to a user equipment (UE), first type SI associated with SI which is essential for communication with the UE, receiving, from the UE, a physical random access channel (PRACH) preamble based on the first type SI, transmitting, to the UE, a random access response (RAR) message, and transmitting, to the UE, second type SI associated with at least one SI which the UE needs.

In accordance with an aspect of the present disclosure, a user equipment (UE) for receiving system information (SI) in a wireless communication system is provided. The UE includes a transceiver configured to transmit and receive a signal, and at least one processor configured to control receiving, from a base station (BS), first type SI associated with SI which is essential for communication with the BS, control transmitting, to the BS, a physical random access channel (PRACH) preamble based on the first type SI, control receiving, from the BS, a random access response (RAR) message, and control receiving, from the BS, second type SI associated with at least one SI which the UE needs.

In accordance with an aspect of the present disclosure, a base station (BS) for transmitting system information (SI) in a wireless communication system is provided. The BS includes a transceiver configured to transmit and receive a signal, and at least one processor configured to control transmitting, to a user equipment (UE), first type SI associated with SI which is essential for communication with the UE, control receiving, from the UE, a physical random access channel (PRACH) preamble based on the first type SI, control transmitting, to the UE, a random access response (RAR) message, and control transmitting, to the UE, second type SI associated with at least one SI which the UE needs.

Advantageous Effects

In accordance with an aspect of the present disclosure, a user equipment (UE) and a BS are provided. The UE and BS are capable of signaling system information efficiently in a wireless communication system.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF DRAWINGS

The above and other aspects, features, and advantages of certain embodiments of the present disclosure will be more apparent from the following description taken in conjunction with the accompanying drawings, in which:

FIG. 13 illustrates a method for acquiring system information according to the other embodiment of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
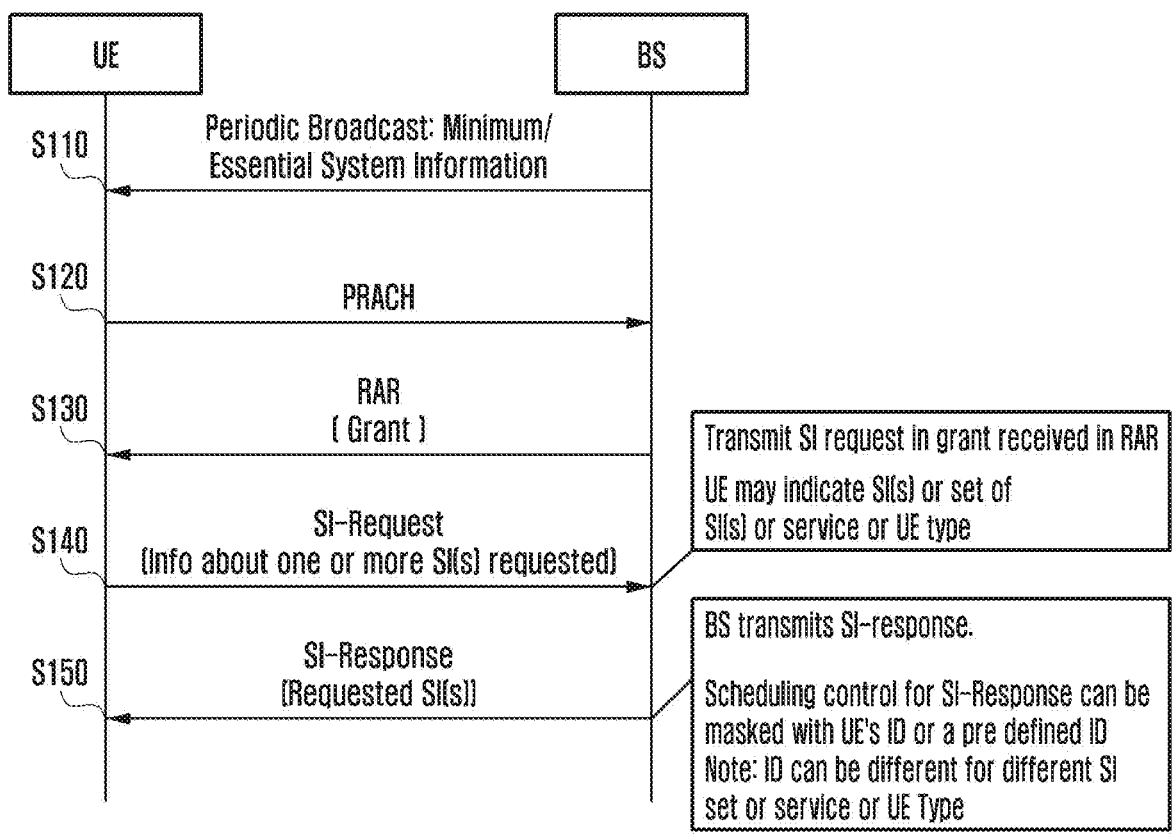
FIG. 1 illustrates a method for acquiring system information according to an embodiment of the present disclosure.

FIG. 1 illustrates a method for acquiring system information according to an embodiment of the present disclosure.

Referring to FIG. 1, in an embodiment of the present disclosure the user equipment (UE) can acquire the system information as shown in FIG. 1. System information (SI) is categorized into two categories: The first category (also referred as minimum SI or essential SI) comprises of one or more system information which are broadcasted periodically by the cell and/or transport, routing, and packaging (TRP) information. The second category (also referred as Other SI) comprises of one or more system information which are provided on demand or can be broadcasted periodically.

The first category comprises of essential system information such as information required for initial access to a cell, information required for acquiring the system information in second category. The first category of system information includes at least system frame number (SFN), list of public land mobile network (PLMN) identifications (IDs), Cell ID, cell camping parameters, etc. The second category of system information includes the system information not included in first category. The first category (also referred as minimum SI or essential SI) of system information is periodically broadcasted by the cell and/or TRP.

In operation 110, UE acquires first category (also referred as minimum SI or essential SI) from broadcasted information. Network signals in first category of system information i.e. in Minimum SI or essential SI whether the system information in the second category is periodically broadcasted or provided on demand.

For example, in case of heterogeneous network comprises of macro cell and small cells, macro cell may indicate that system information is broadcasted whereas small cells may indicate that system information is not broadcasted. In another example, if there are several requests for system information provided on demand then network may start to broadcast the system information instead of providing on demand.

Minimum SI or essential SI may include an indication which indicates that all SIs of second category of system information are periodically broadcasted or are provided on demand. Alternately, minimum SI or essential SI may include a separate indication for each SI (e.g. system information block (SIB)) or set of SIs (i.e. SIBs) wherein each indication indicates whether the associated SI or set of SIs are periodically broadcasted or are provided on demand.

Alternately, minimum SI or essential SI may include a separate indication for each SI message wherein each SI message carries one or more SIs (i.e. SIBs). The indication associated with an SI message indicates whether SIs associated with that SI message are broadcasted or provided on demand. Mapping of SI message to SIBs in included in minimum SI or essential SI.

In order to acquire a SI of second category, UE first determines whether that SI is periodically broadcasted or provided on demand. UE determines this based on indication included in first category (also referred as minimum SI or essential SI) of system information. If first category (also referred as minimum SI or essential SI) of system information indicates that SI which UE wants to acquire is periodically broadcasted (or not provided on demand) then UE acquires the SI from the periodic broadcast using the scheduling information included in first category (also referred as minimum SI or essential SI), in operation S110. If first category (also referred as minimum SI or essential SI) of system information indicates that SI which UE wants to acquire is not periodically broadcasted (or provided on demand) then UE sends request to base station (BS) to receive that SI.

In order to receive one or more system information provided on demand, in operation S120, UE transmits random access preamble (PRACH). In an embodiment, PRACH preambles or PRACH opportunities (i.e. time/frequency resources) for requesting system information can be different from the PRACH preambles or PRACH opportunities for other purposes. This can minimize impact to random access load because of SI requests. PRACH preambles or PRACH opportunities (i.e. time/frequency resources) for obtaining system information can be pre-defined or signaled by network in first category (also referred as minimum SI or essential SI) of system information.

On receiving the random access preamble, in operation S130, BS transmits a random access response (RAR) and the RAR includes an uplink (UL) grant for transmitting the SI request message. The RAR may also include timing advance and/or back off indicator and or preamble identifier (identifies the PRACH preamble).

UE validates that the RAR corresponds to PRACH transmitted by it. If the validation is successful, in operation S140, the UE transmits an SI request message in the UL grant. The SI request message indicates one or more system information (e.g. SIBs) which UE needs or indicates one or more sets of system information which the UE needs or indicates service (e.g. enhanced mobile broadband (eMBB), mobile telecommunications company (MTC), ultra-reliable and low-latency (URLL), etc.) for which UE needs system information or UE type. UE may transmit its UE ID (i.e. SAE-temporary mobile subscriber identity (S-TMSI), cell-radio network temporary identifier (C-RNTI), random access-radio network temporary identifier (RA-RNTI), etc.) along with the SI request message.

In response to the SI request, in operation S150, BS transmits SI-response wherein the SI-response includes the requested system information. SI response can be broadcasted or provided in unicast manner. Scheduling control information indicating the SI-response can be masked with UE's ID (e.g. C-RNTI, RA-RNTI) or a pre-defined ID (e.g. system information-radio network temporary identifier (SI-RNTI)). Pre-defined ID can be different for different system information or system information set or service or UE type.

One or more SIs (i.e. SIBs) requested by UE are provided within some time window (i.e. SI Response Window) after sending the SI request. After sending the SI request the UE listens to new radio-physical downlink control channel (NR-PDCCH) in SI Response Window for receiving the requested SIBs. If UE does not receive the requested SIBs within the SI Response Window then UE may retransmit the SI request. The length of SI response window is provided in minimum SI or essential SI. Alternately, after sending the SI request, for receiving the requested SIB, UE monitors the SI window of requested SIB in one or more SI periods of that SIB. The scheduling information for other SI including SIB type, validity information, periodicity, SI-window information can be provided in minimum SI irrespective of whether Other SI is periodically broadcasted or provided on demand. In one embodiment, UE first checks for SI response in SI response window and if not received it monitors the SI window for receiving the requested SIs.

In one embodiment, evolved node B (eNB) may provide the requested system information for one or more cells and/or TRPs. ENB may indicate the cells and/or TRPs for which system information provided in SI response is applicable. As a result the UE does not need to request for system information when the UE changes cell and/or TRP. After the cell and/or TRP change, if the UE does not have system information for the new cell and/or TRP then UE request for system information.

In another embodiment of the present disclosure, BS can indicate supported SI(s) in essential system information. UE can then request one or more of the supported SIs which are provided on demand using the method (FIG. 1) explained earlier. In an embodiment, a default configuration for system information can be defined which the UE uses until it obtains them from the cell.

In another embodiment, a cell may broadcast some of the SIs in the first category of system information. The remaining SIs in the first category of system information of a cell can be broadcasted or provided on demand by another cell. In the request, UE may include information (e.g. cell ID, frequency, cell index, etc.) about the cell for which it is requesting SI.

Figure 2:
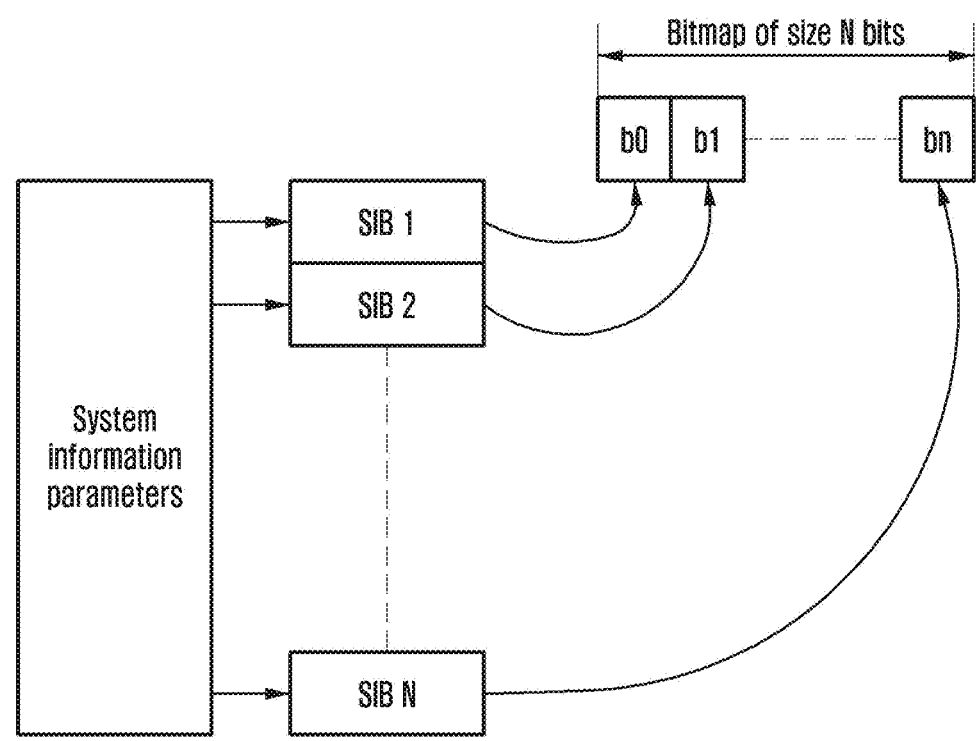
FIG. 2 illustrates a method for categorizing system information parameters into system information blocks (SIBs) according to an embodiment of the present disclosure.

UE can indicate the needed system information in SI-Request using one of the following options (Option 1~Option 5):

Option 1:

FIG. 2 illustrates a method for categorizing system information parameters into SIBs according to an embodiment of the present disclosure.

Referring to FIG. 2, system information parameters are categorized into SIBs. In SI request, a bitmap of size N bits is included wherein each bit corresponds to an SIB. Bit corresponding to an SIB can be set to one to indicate that UE needs that SIB or Bit corresponding to an SIB can be set to zero to indicate that UE needs that SIB. Alternately, instead of bitmap, UE can include a list of SIBs in SI-request.

Figure 3:
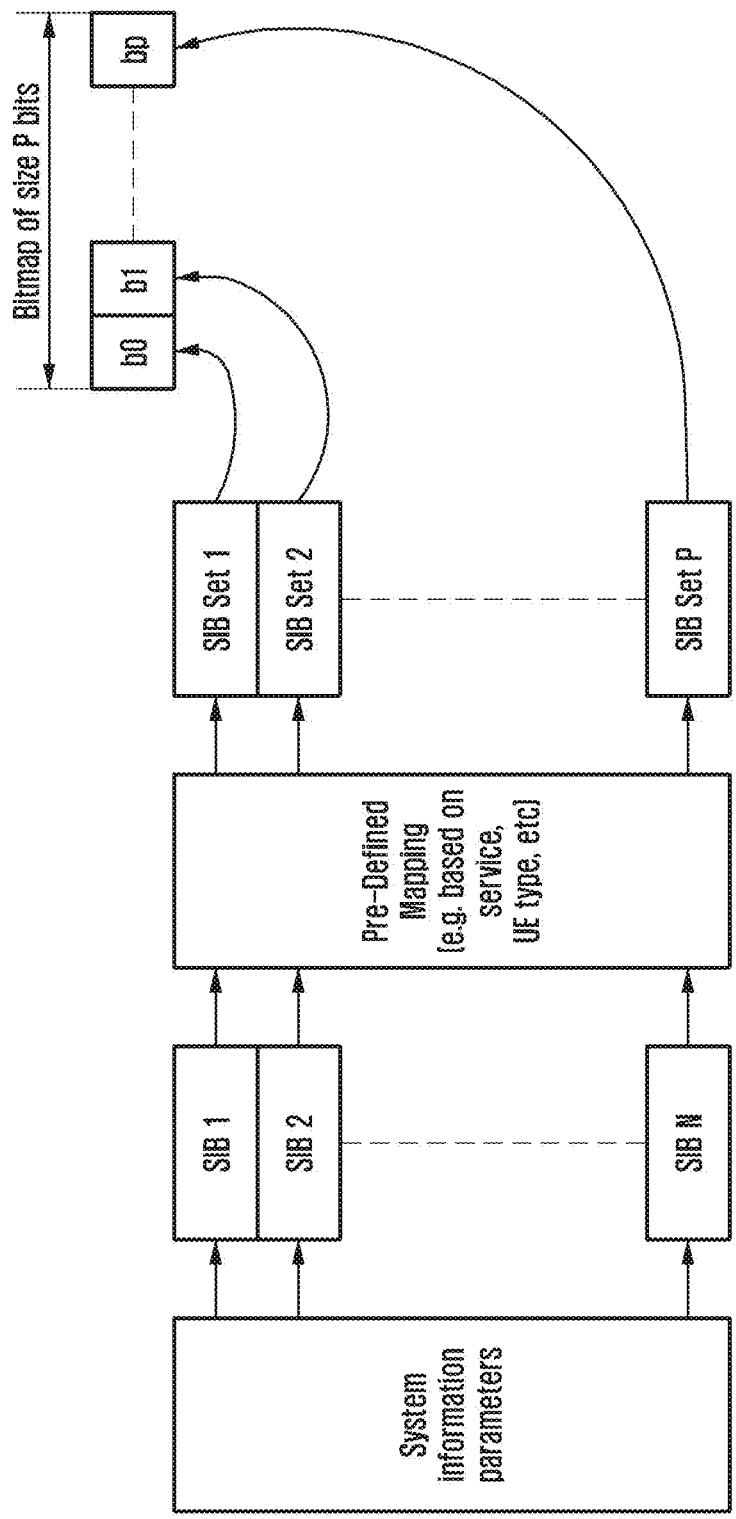
FIG. 3 illustrates a method for categorizing system information parameters into SIBs according to an embodiment of the present disclosure.

Option 2:

FIG. 3 illustrates a method for categorizing system information parameters into SIBs according to another embodiment of the present disclosure.

Referring to FIG. 3, system information parameters are categorized into SIBs. SIBs are then grouped into an SIB set (or SI message) wherein each set comprises one or more SIBs.

An SIB can be present in more than one SIB set. Grouping of SIBs into SIB set can be done based on service (e.g. mobile broadband (MBB), URLL, mobile telecommunications company (MTC), device to device (D2D), D2D-discovery, D2D-Communication, vehicle-to-everything (V2X), vehicle-to-vehicle (V2V) etc.) or UE type (MTC UE, MBB UE, D2D UE, etc.).

In SI request, a bitmap of size P bits is included wherein each bit corresponds to a SIB set. Bit corresponding to a SIB set can be set to one to indicate that UE needs that SIB. Alternately, instead of bitmap, UE can include a list of SIB set in SI-request.

Figure 4:
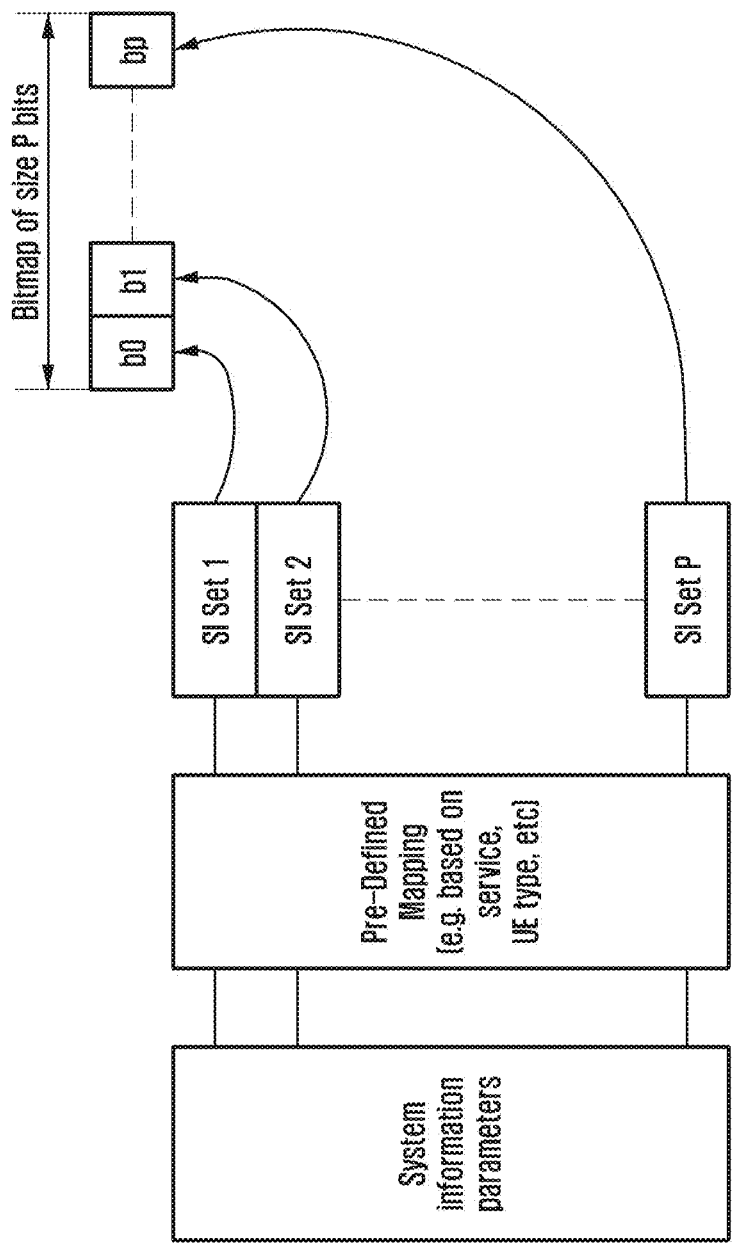
FIG. 4 illustrates a method for categorizing system information parameters into system information set according to an embodiment of the present disclosure.

Option 3:

FIG. 4 illustrates a method for categorizing system information parameters into system information set according to an embodiment of the present disclosure.

Referring to FIG. 4, system information parameters are categorized into system information set. Grouping of system information parameters into system information set can be done based on service (e.g. MBB, URLL, MTC, D2D, D2D-discovery, D2D-Communication, V2X, V2V etc.) or UE type (MTC UE, MBB UE, D2D UE, etc.). In SI request, a bitmap of size P bits is included wherein each bit corresponds to a system information set. Bit corresponding to system information set can be set to one to indicate that UE needs that system information set. Alternately, instead of bitmap, UE can include a list of SI sets in SI-request.

Figure 5:
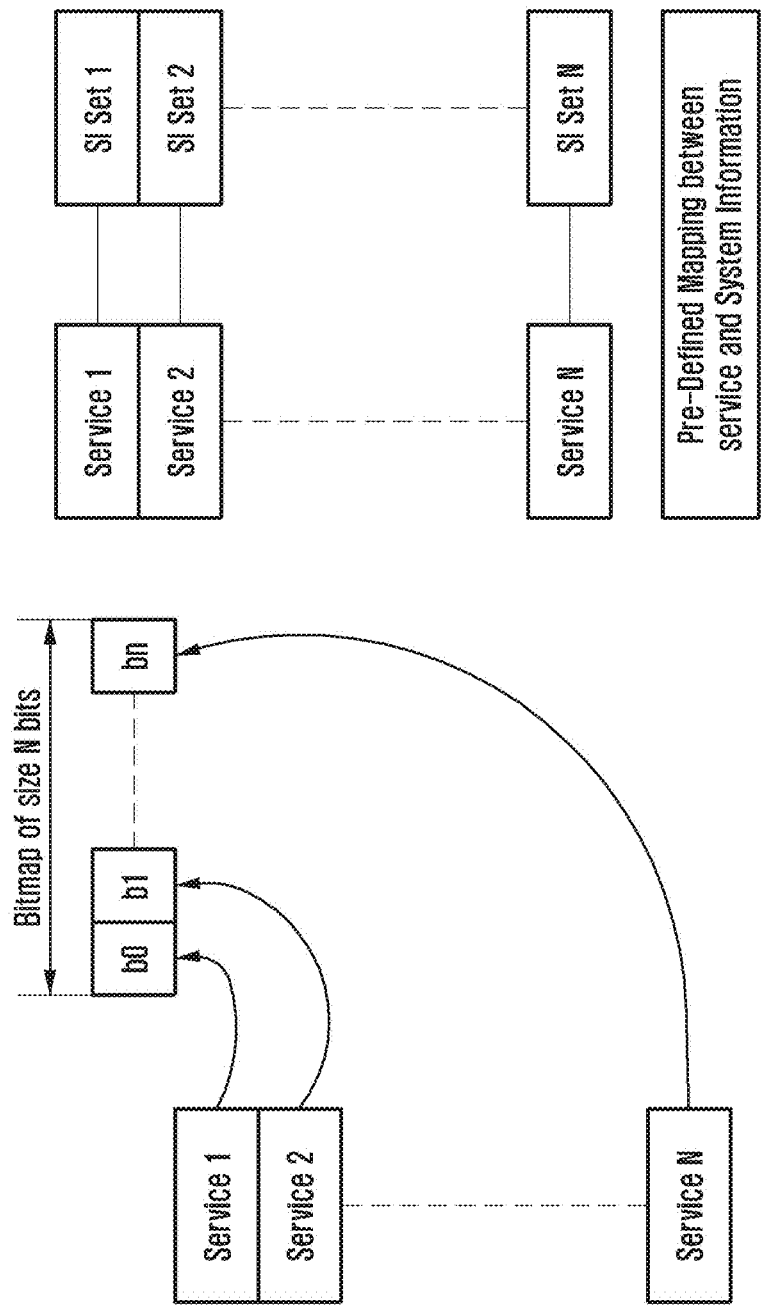
FIG. 5 illustrates a method for categorizing system information parameters into system information set according to another embodiment of the present disclosure.

Option 4:

FIG. 5 illustrates a method for categorizing system information parameters into system information set according to another embodiment of the present disclosure.

Referring to FIG. 5, there is pre-defined mapping between one or more system information parameters and service. In SI request, a bitmap of size N bits is included wherein each bit corresponds to a service. Bit corresponding to service can be set to one to indicate that UE needs system information for this service. Alternately, instead of bitmap, UE can include a list of one or more services in SI-request wherein each service can be identified by a service type.

Option 5:

In this method, UE can indicate UE type in SI request. UE type indicates the service supported by the UE. There is pre-defined mapping between one or more system information parameters and service. So on receiving the SI request with UE type, BS can know the system information parameters needed by UE.

Figure 6:
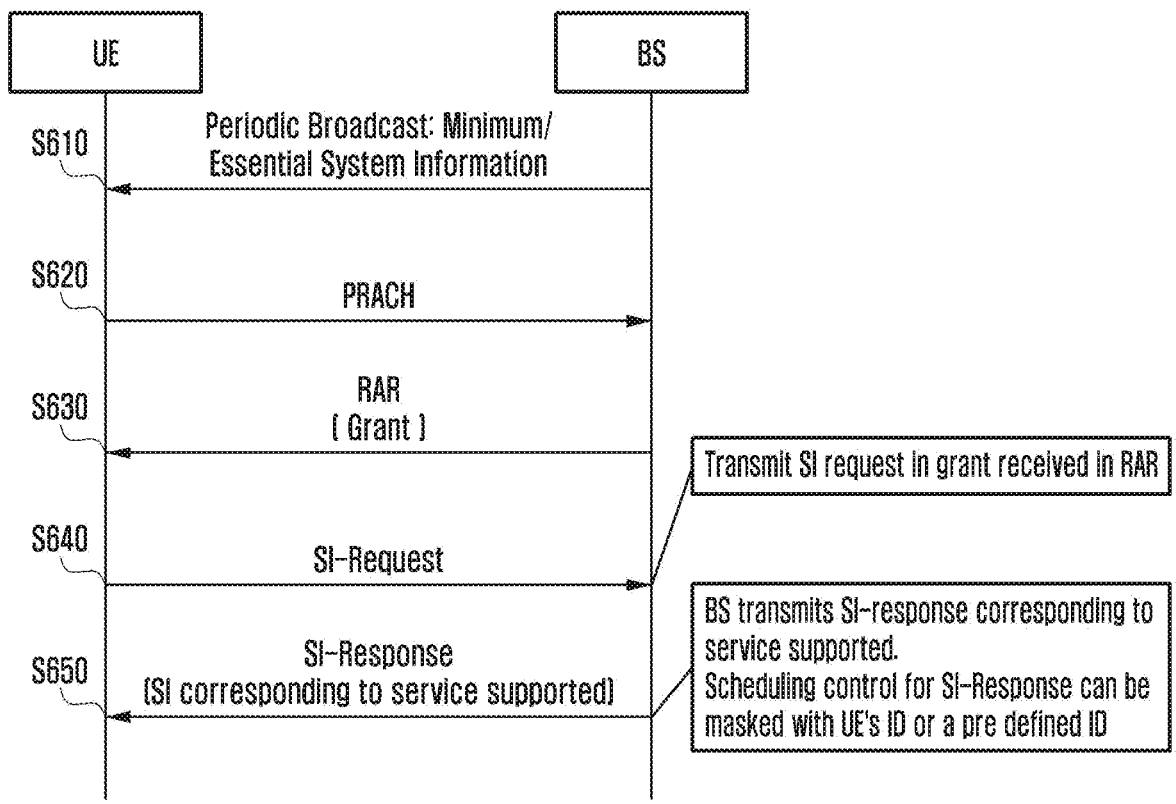
FIG. 6 illustrates a method for acquiring system information according to the other embodiment of the present disclosure.

FIG. 6 illustrates a method for acquiring system information according to the other embodiment of the present disclosure.

Referring to FIG. 6, in another embodiment of the present disclosure the UE can acquire the system information as shown in FIG. 6. System information is categorized into two categories: The first category (also referred as minimum SI or essential SI) comprises of one or more System information which are broadcasted periodically by the cell and/or TRP. The second category (also referred as Other SI) comprises of one or more system information which is provided to UE on demand or can be broadcasted periodically.

The first category comprises of essential system information such as information required for initial access to a cell, information required for acquiring the system information in second category. The first category of system information includes at least SFN, list of PLMN IDs, Cell ID, cell camping parameters, etc. The second category of system information includes the system information not included in first category.

The first category (also referred as minimum SI or essential SI) of system information is periodically broadcasted by the cell and/or TRP. In operation S610, UE acquires first category (also referred as minimum SI or essential SI) of system information from broadcasted information. Network signals in first category of system information i.e. in Minimum SI or essential SI whether the system information in the second category is periodically broadcasted or provided on demand.

For example, in case of heterogeneous network comprises of macro cell and small cells, macro cell may indicate that system information is broadcasted whereas small cells may indicate that system information is not broadcasted. In another example, if there are several requests for system information provided on demand then network may start to broadcast the system information instead of providing on demand. Minimum SI or essential SI may include in indication which indicates that all SIs of second category of system information are periodically broadcasted or are provided on demand.

Alternately, minimum SI or essential SI may include a separate indication for each SI (e.g., SIB) or set of SIs (i.e., SIBs) wherein each indication indicates whether the associated SI or set of SIs are periodically broadcasted or are provided on demand.

Alternately, minimum SI or essential SI may include a separate indication for each SI message wherein each SI message carries one or more SIs (i.e., SIBs). The indication associated with an SI message indicates whether SIs associated with that SI message are broadcasted or provided on demand. Mapping of SI message to SIBs in included in minimum SI or essential SI. In order to acquire a SI of second category, UE first determines whether that SI is periodically broadcasted or provided on demand. UE determines this based on indication included in first category (also referred as minimum SI or essential SI) of system information.

If first category (also referred as minimum SI or essential SI) of system information indicates that SI which UE wants to acquire is periodically broadcasted (or not provided on demand) then UE acquires the SI from the periodic broadcast using the scheduling information included in first category (also referred as minimum SI or essential SI) of system information. If first category (also referred as minimum SI or essential SI) of system information indicates that SI which UE wants to acquire is not periodically broadcasted (or provided on demand) then UE sends request to BS to receive that SI.

In order to receive one or more system information provided on demand, in operation S620, UE transmits random access preamble. In an embodiment, PRACH preambles or PRACH opportunities (i.e. time/frequency resources) for requesting system information can be different from the PRACH preambles or PRACH opportunities for other purposes. This can minimize impact to random access load because of SI requests. PRACH preambles or PRACH opportunities (i.e. time/frequency resources) for obtaining system information can be predefined or signaled by network in first category (also referred as minimum SI or essential SI) of system information.

On receiving the random access preamble, in operation S630, BS transmits a RAR and RAR includes UL grant for transmitting the SI request message. RAR may also include timing advance and/or back off indicator and or preamble identifier (identifies the PRACH preamble).

UE validates that RAR corresponds to PRACH transmitted by it. If the validation is successful, in operation S640, UE transmits SI request message in the UL grant. UE may not indicate which system information is needed by UE. The carrier on which UE sends SI request supports one service. UE indicates that it needs system information. BS provides system information for the service supported on carrier. There can be pre-defined mapping between carrier and service.

Alternately, service supported can be indicated in first category (also referred as minimum SI or essential SI) of system information. In operation S650, SI response can be broadcasted or provided in unicast manner. Scheduling control information indicating the SI-response can be masked with UE's ID (e.g. C-RNTI, RA-RNTI) or a pre-defined ID (e.g., SI-RNTI). Pre-defined ID can be different for different system information or system information set or service or UE type.

One or more SIs (i.e., SIBs) requested by UE are provided within some time window (i.e. SI Response Window) after sending the SI request. After sending the SI request, the UE listens to NR-PDCCH in SI Response Window for receiving the requested SIBs. If UE does not receive the requested SIBs within the SI Response Window then UE may retransmit the SI request.

The length of SI response window is provided in minimum SI or essential SI. Alternately, after sending the SI request, for receiving the requested SIB, UE monitors the SI window of requested SIB in one or more SI periods of that SIB. The scheduling information for other SI including SIB type, validity information, periodicity, SI-window information can be provided in minimum SI irrespective of whether Other SI is periodically broadcasted or provided on demand. In one embodiment, UE first checks for SI response in SI response window and if not received it monitors the SI window for receiving the requested SIs.

In an embodiment, eNB may provide the requested system information for one or more cells and/or TRPs. ENB may indicate the cells and/or TRPs for which system information provided in SI response is applicable. As a result, the UE does not need to request for system information when the UE changes cell and/or TRP. After the cell and/or TRP change, if the UE does not have system information for the new cell and/or TRP then UE request for system information.

In another embodiment of the present disclosure, BS can indicate supported SI(s) in essential system information. UE can then request one or more of the supported SIs using the method (FIG. 6) explained earlier. In an embodiment, a default configuration for system information can be defined which the UE uses until it obtains them from the cell.

In another embodiment, a cell may broadcast some of the SIs in the first category of system information. The remaining SIs in the first category of system information of a cell can be broadcasted or provided on demand by another cell. In the request, UE may include information (e.g., cell ID, frequency, cell index, etc.) about the cell for which it is requesting SI.

Figure 7:
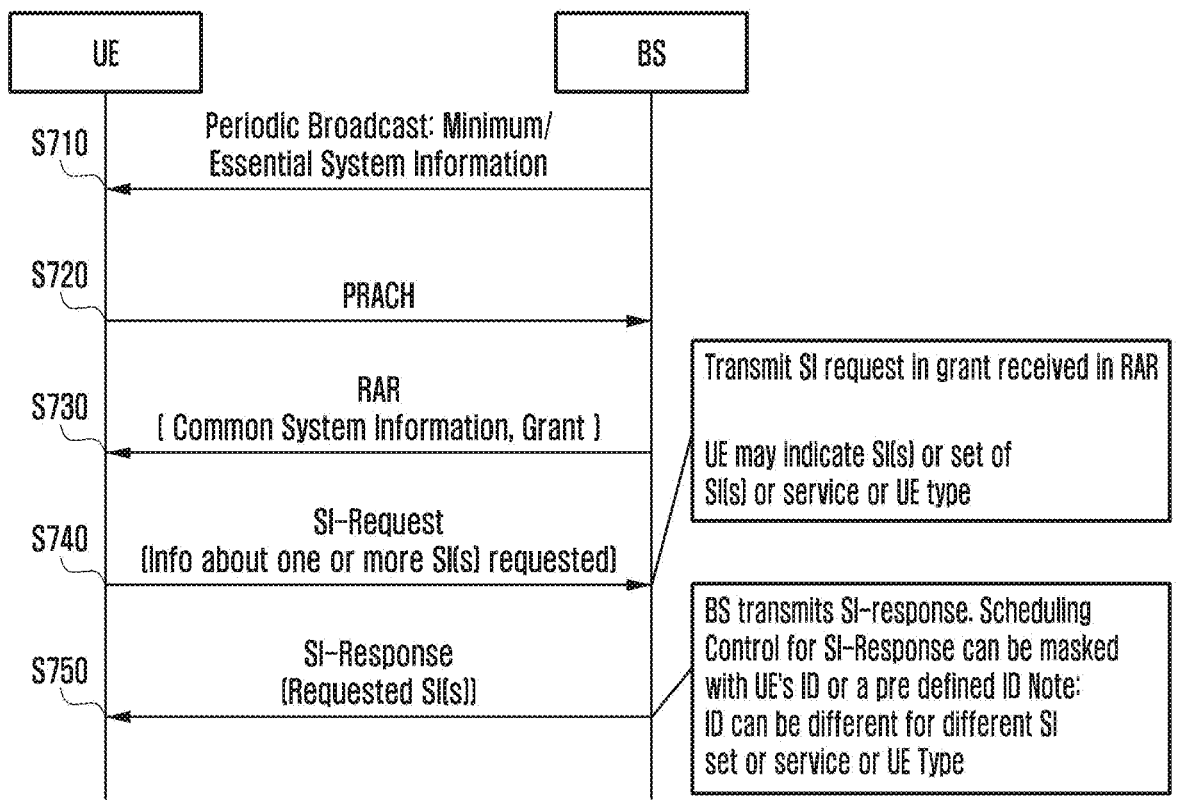
FIG. 7 illustrates a method for acquiring system information according to the other embodiment of the present disclosure.

FIG. 7 illustrates a method for acquiring system information according to the other embodiment of the present disclosure.

Referring to FIG. 7, in this method of the present disclosure the UE can acquire the system information as shown in FIG. 7. System information is categorized into two categories: The first category (also referred as minimum SI or essential SI) comprises of one or more System information which is broadcasted periodically by the cell and/or TRP. The second category (also referred as Other SI) comprises of one or more common system information which is provided to UE on demand or can be broadcasted periodically.

The first category comprises of essential system information such as information required for initial access to a cell, information required for acquiring the system information in second category. The first category of system information includes at least SFN, list of PLMN IDs, Cell ID, cell camping parameters, etc. The second category of system information includes the system information not included in first category. The first category (also referred as minimum SI or essential SI) of system information is periodically broadcasted by the cell and/or TRP. In operation S710, UE acquires first category (also referred as minimum SI or essential SI) of system information from broadcasted information.

Network signals in first category of system information i.e. in Minimum SI or essential SI whether the system information in the second category is periodically broadcasted or provided on demand. For example, in case of heterogeneous network comprises of macro cell and small cells, macro cell may indicate that system information is broadcasted whereas small cells may indicate that system information is not broadcasted. In another example, if there are several requests for system information provided on demand then network may start to broadcast the system information instead of providing on demand. Minimum SI or essential SI may include in indication which indicates that all SIs of second category of system information are periodically broadcasted or are provided on demand. Alternately, minimum SI or essential SI may include a separate indication for each SI (e.g. SIB) or set of SIs (i.e., SIBs) wherein each indication indicates whether the associated SI or set of SIs are periodically broadcasted or are provided on demand.

Alternately, minimum SI or essential SI may include a separate indication for each SI message wherein each SI message carries one or more SIs (i.e., SIBs). The indication associated with an SI message indicates whether SIs associated with that SI message are broadcasted or provided on demand. Mapping of SI message to SIBs in included in minimum SI or essential SI. In order to acquire a SI of second category, UE first determines whether that SI is periodically broadcasted or provided on demand. UE determines this based on indication included in first category (also referred as minimum SI or essential SI) of system information.

If first category (also referred as minimum SI or essential SI) of system information indicates that SI which UE wants to acquire is periodically broadcasted (or not provided on demand) then UE acquires the SI from the periodic broadcast using the scheduling information included in first category (also referred as minimum SI or essential SI) of system information. If first category (also referred as minimum SI or essential SI) of system information indicates that SI which UE wants to acquire is not periodically broadcasted (or provided on demand) then UE sends request to BS to receive that SI.

The second category of system information may be further classified into common system information and non-common system information. Common system information comprises of one or more SIs (i.e., SIBs) which are needed by every UE irrespective of feature or service in which they are interested. Non common system information comprises of one or more SIs (i.e. SIBs) which are not needed by every UE. These SIs are feature or service specific (e.g. SIBs related to D2D, MTC, V2V, V2X, multimedia broadcast/multicast service (MBMS) etc.).

In order to receive the one or more SIs provided on demand, in operation S720, UE transmits random access preamble. PRACH preambles or PRACH opportunities (i.e. time/frequency resources) for obtaining system information can be different from the PRACH preambles or PRACH opportunities for other purposes. PRACH preambles or PRACH opportunities for obtaining system information can be predefined or signaled by network in first category (also referred as minimum SI or essential SI) of system information.

On receiving the random access preamble, in operation S730, BS transmits a random access response (RAR) and the RAR may include UL grant for transmitting the system information request message. RAR includes the common system information. RAR may also include timing advance and/or back off indicator and or preamble identifier (identifies the PRACH preamble).

UE validates that RAR corresponds to PRACH transmitted by it. If the validation is successful, in operation S740, UE may transmit SI request message in the UL grant to request one or more system information according to its need. SI request message indicates system information or set of system information or service or UE type. UE may transmit its UE ID (i.e., S-TMSI, C-RNTI, RA-RNTI, etc.) along with SI request message. In response to SI request, ENB transmits SI-response wherein the SI-response includes the requested system information, in operation S750.

Scheduling control information indicating the SI-response can be masked with UE's ID (e.g., C-RNTI, RA-RNTI) or a pre-defined ID (e.g., SI-RNTI). Pre-defined ID can be different for different system information or system information set or service or UE type. UE can indicate the needed system information in SI-Request using the options explained in description of method 1.

In an embodiment, based on PRACH preamble, content of RAR can be one of the following:
1. Common system information and No UL grant: This is the case when UE needs only common SI.
2. Common system information and UL grant: This is the case when UE needs both common SI and some other SIs. This is also the case when UE needs common SI and wants to send some other RRC message (e.g., connection request, connection resume request, etc.) after receiving the RAR.
3. UL grant: This is the case when UE does not need any SI or when UE does not need common system information but needs some other SI.

PRACH preamble(s) and/or PRACH opportunity(s) can be different for each of the above. PRACH preambles or PRACH opportunities for obtaining system information for each of these cases can be predefined or signaled by network in first category (also referred as minimum SI or essential SI) of system information.

UE select the appropriate PRACH preamble and/or PRACH opportunity accordingly. For example, UE may only need common system information. If UE needs only common system information it indicates to eNB using the appropriate PRACH preamble and/or PRACH opportunity. PRACH preamble(s) and/or PRACH opportunity(s) for this purpose is different from other purposes. In this case, UE will not send SI request after receiving the RAR.

In another scenario, UE needs common system information and also wants to request additional system information. In this case, UE needs common system information and UL grant in RAR. UE indicates to eNB using the appropriate PRACH preamble and/or PRACH opportunity. PRACH preamble(s) and/or PRACH opportunity(s) for this purpose is different from other purposes. In this case, UE will send SI request after receiving the RAR. In another scenario, UE may want to request system information and needs UL grant in RAR. UE indicates to eNB using the appropriate PRACH preamble and/or PRACH opportunity. PRACH preamble(s) and/or PRACH opportunity(s) for this purpose is different from other purposes.

In an embodiment, eNB may provide the requested system information for one or more cells and/or TRPs. ENB may indicate the cells and/or TRPs for which system information provided in SI response is applicable. As a result, the UE does not need to request for system information when the UE changes cell and/or TRP. After the cell and/or TRP change, if the UE does not have system information for the new cell and/or TRP then UE request for system information.

In another embodiment of the present disclosure, BS can indicate supported SI(s) in essential system information. UE can then request one or more of the supported SIs using the method (FIG. 7) explained earlier.

In another embodiment, a cell may broadcast some of the SIs in the first category of system information. The remaining SIs in the first category of system information of a cell can be broadcasted or provided on demand by another cell. In the request, UE may include information (e.g., cell ID, frequency, cell index, etc.) about the cell for which it is requesting SI.

Figure 8:
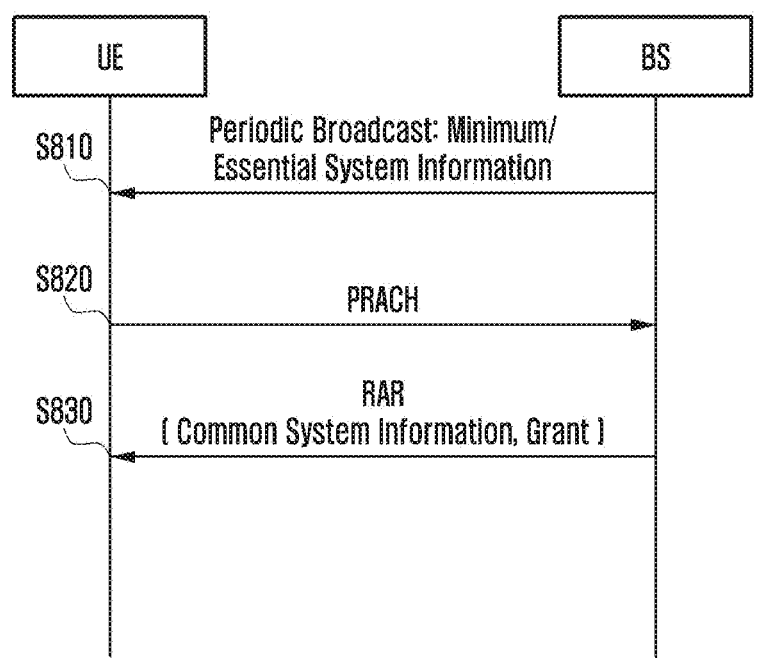
FIG. 8 illustrates a method for acquiring system information according to the other embodiment of the present disclosure.

FIG. 8 illustrates a method for acquiring system information according to the other embodiment of the present disclosure.

Referring to FIG. 8, in this method of the present disclosure the UE can acquire the system information as shown in FIG. 8. System information is categorized into two categories: The first category (also referred as minimum SI or essential SI) comprises of one or more System information which is broadcasted periodically by the cell and/or TRP. The second category (also referred as Other SI) comprises of one or more common system information which is provided to UE on demand or can be broadcasted periodically.

The first category comprises of essential system information such as information required for initial access to a cell, information required for acquiring the system information in second category. The first category of system information includes at least SFN, list of PLMN IDs, Cell ID, cell camping parameters, etc. The second category of system information includes the system information not included in first category.

The first category (also referred as minimum SI or essential SI) of system information is periodically broadcasted by the cell and/or TRP. In operation S810, UE acquires first category (also referred as minimum SI or essential SI) of system information from broadcasted information.

Network signals in first category of system information i.e. in Minimum SI or essential SI whether the system information in the second category is periodically broadcasted or provided on demand. For example, in case of heterogeneous network comprises of macro cell and small cells, macro cell may indicate that system information is broadcasted whereas small cells may indicate that system information is not broadcasted. In another example, if there are several requests for system information provided on demand then network may start to broadcast the system information instead of providing on demand. Minimum SI or essential SI may include in indication which indicates that SIs of second category of system information are periodically broadcasted or are provided on demand. Alternately, minimum SI or essential SI may include a separate indication for each SI (e.g. SIB) or set of SIs (i.e., SIBs) wherein each indication indicates whether the associated SI or set of SIs are periodically broadcasted or are provided on demand.

Alternately, minimum SI or essential SI may include a separate indication for each SI message wherein each SI message carries one or more SIs (i.e., SIBs). The indication associated with an SI message indicates whether SIs associated with that SI message are broadcasted or provided on demand. Mapping of SI message to SIBs in included in minimum SI or essential SI. In order to acquire a SI of second category, UE first determines whether that SI is periodically broadcasted or provided on demand. UE determines this based on indication included in first category (also referred as minimum SI or essential SI) of system information.

If first category (also referred as minimum SI or essential SI) of system information indicates that SI which UE wants to acquire is periodically broadcasted (or not provided on demand) then UE acquires the SI from the periodic broadcast using the scheduling information included in first category (also referred as minimum SI or essential SI) of system information. If first category (also referred as minimum SI or essential SI) of system information indicates that SI which UE wants to acquire is not periodically broadcasted (or provided on demand) then UE sends request to BS to receive that SI.

In order to receive the one or more system information provided on demand, in operation S820, UE transmits random access preamble (PRACH). PRACH preambles and/or or PRACH opportunities for obtaining system information in RAR can be different from the PRACH preambles and/or PRACH opportunities for other purposes.

In an embodiment of the present disclosure, on receiving the random access preamble, in operation S830, BS transmits a RAR. The random access preamble acts as SI request in this method. RAR includes SI response i.e. the common system information.

In an embodiment, UE may obtain other system information specific to its need using dedicated signaling (For example, UE may enter connected state and request system information in dedicated manner to eNB). In alternate embodiment, on receiving the random access preamble for SI, SI response can be broadcasted or provided in unicast manner. Scheduling control information indicating the SI-response can be masked with UE's ID (e.g., C-RNTI, RA-RNTI) or a pre-defined ID (e.g. SI-RNTI). Pre-defined ID can be different for different system information or system information set or service or UE type. One or more SIs (i.e. SIBs) requested by UE are provided within some time window (i.e., SI Response Window) after sending the SI request. After sending the SI request, the UE listens to NR-PDCCH in SI Response Window for receiving the requested SIBs.

If UE does not receive the requested SIBs within the SI Response Window then UE may retransmit the SI request. The length of SI response window is provided in minimum SI or essential SI. Alternately, after sending the SI request, for receiving the requested SIB, UE monitors the SI window of requested SIB in one or more SI periods of that SIB.

The scheduling information for other SI including SIB type, validity information, periodicity, SI-window information can be provided in minimum SI irrespective of whether Other SI is periodically broadcasted or provided on demand. In one embodiment, UE first checks for SI response in SI response window and if not received it monitors the SI window for receiving the requested SIs.

In an embodiment in which SI response is broadcasted in SI window instead of SI response window or in RAR, RAR may still be transmitted to acknowledge the successful reception of SI request. In an embodiment in which SI response is broadcasted in SI window instead of SI response window or in RAR, successful reception of SI request can be indicated by BS by including an indication in minimum SI.

In an embodiment, eNB may provide the system information for one or more cells and/or TRPs. ENB may indicate the cells and/or TRPs for which system information provided in RAR is applicable. As a result, the UE does not need to request for system information when the UE changes cell and/or TRP. After the cell and/or TRP change, if the UE does not have system information for the new cell and/or TRP then UE request for system information.

In another embodiment of the present disclosure, BS can indicate supported SI(s) in essential system information. UE can then request one or more of the supported SIs using the method (FIG. 8) explained earlier.

Figure 9:
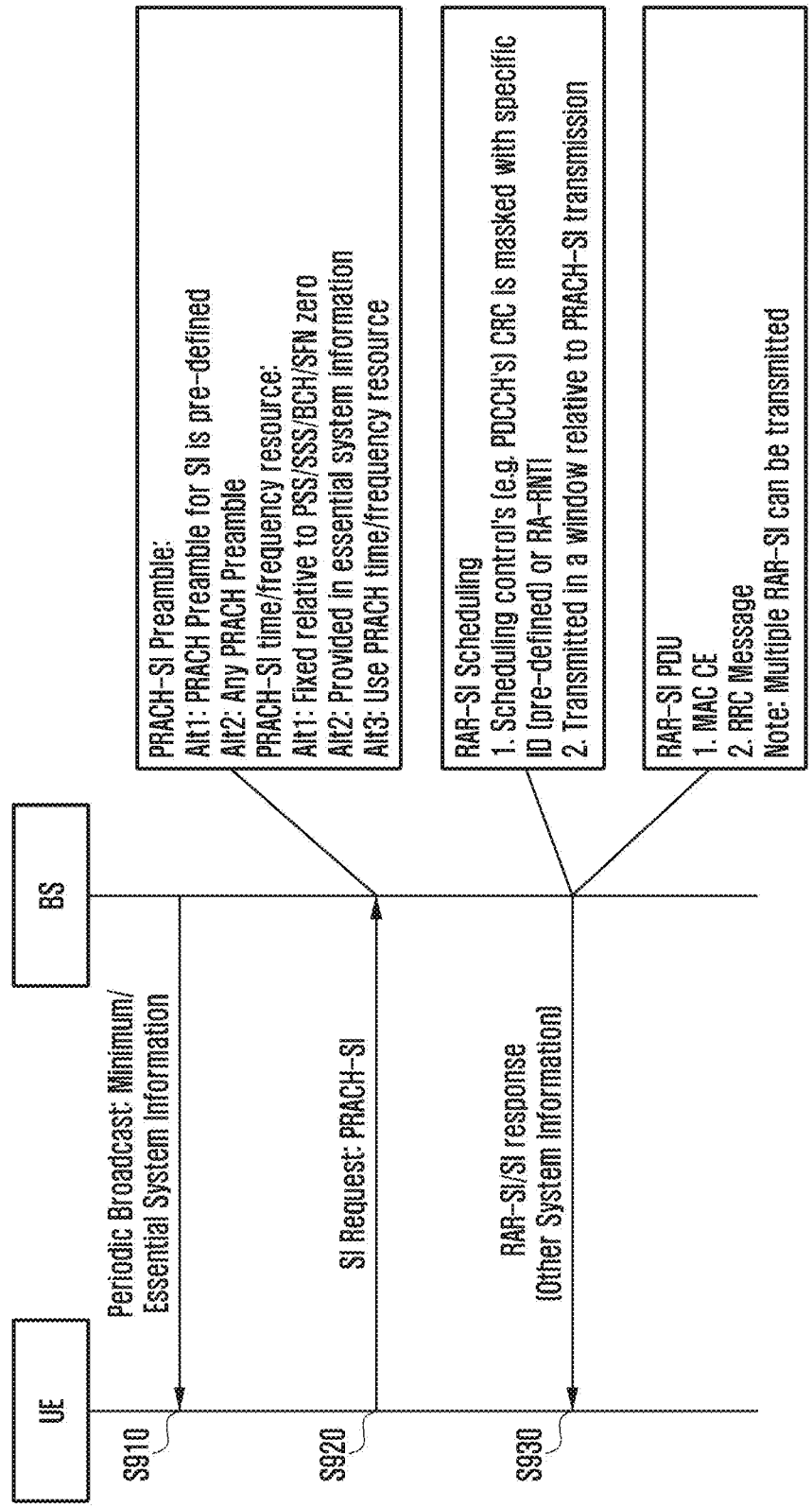
FIG. 9 illustrates a method for acquiring system information according to the other embodiment of the present disclosure.

FIG. 9 illustrates a method for acquiring system information according to the other embodiment of the present disclosure.

Referring to FIG. 9, in this method of the present disclosure the UE can acquire the system information as shown in FIG. 9. System information is categorized into two categories: The first category (also referred as minimum SI or essential SI) comprises of one or more System information which is broadcasted periodically by the cell and/or TRP. The second category (also referred as Other SI) comprises of one or more common system information which is provided to UE on demand or can be broadcasted periodically.

The first category comprises of essential system information such as information required for initial access to a cell, information required for acquiring the system information in second category. The first category of system information includes at least SFN, list of PLMN IDs, Cell ID, cell camping parameters, etc. The second category of system information includes the system information not included in first category.

The first category (also referred as minimum SI or essential SI) of system information is periodically broadcasted by the cell and/or TRP. In operation S910, UE acquires first category (also referred as minimum SI or essential SI) of system information from broadcasted information.

Network signals in first category of system information i.e. in Minimum SI or essential SI whether the system information in the second category is periodically broadcasted or provided on demand. For example, in case of heterogeneous network comprises of macro cell and small cells, macro cell may indicate that system information is broadcasted whereas small cells may indicate that system information is not broadcasted.

In another example, if there are several requests for system information provided on demand then network may start to broadcast the system information instead of providing on demand. Minimum SI or essential SI may include in indication which indicates that SIs of second category of system information are periodically broadcasted or are provided on demand. Alternately, minimum SI or essential SI may include a separate indication for each SI (e.g. SIB) or set of SIs (i.e., SIBs) wherein each indication indicates whether the associated SI or set of SIs are periodically broadcasted or are provided on demand.

Alternately, minimum SI or essential SI may include a separate indication for each SI message wherein each SI message carries one or more SIs (i.e., SIBs). The indication associated with an SI message indicates whether SIs associated with that SI message are broadcasted or provided on demand. Mapping of SI message to SIBs in included in minimum SI or essential SI. In order to acquire a SI of second category, UE first determines whether that SI is periodically broadcasted or provided on demand.

UE determines this based on indication included in first category (also referred as minimum SI or essential SI) of system information. If first category (also referred as minimum SI or essential SI) of system information indicates that SI which UE wants to acquire is periodically broadcasted (or not provided on demand) then UE acquires the SI from the periodic broadcast using the scheduling information included in first category (also referred as minimum SI or essential SI). If first category (also referred as minimum SI or essential SI) of system information indicates that SI which UE wants to acquire is not periodically broadcasted (or provided on demand) then UE sends request to BS to receive that SI.

In order to receive one or more system information provided on demand, in operation S920, UE sends random access preamble (PRACH-SI). The random access preamble acts as SI request in this method. PRACH preambles and/or or PRACH opportunities for obtaining system information in RAR can be different from the PRACH preambles and/or PRACH opportunities for other purposes.

In an embodiment, PRACH-SI preamble for obtaining system information in RAR is pre-defined. In this option, PRACH time/frequency resource can be one of following:
  Alt1: Fixed relative to PSS/SSS/BCH/SFN 0
  Alt2: Provided in essential system information
  Alt3: Use normal PRACH time/frequency resource In another embodiment, PRACH-SI preamble for obtaining system information in RAR is not pre-defined. UE can use any PRACH preamble. In this option, PRACH time/frequency resource is specific to PRACH-SI and can be one of the following:
  Alt1: Fixed relative to PSS/SSS/BCH/SFN 0
  Alt2: Provided in essential system information UE determines the PRACH-SI Transmit Power using one of the following options:
  Alt1: Open loop power control similar to PRACH
  Alt2: Transmit at max power
  Alt3: Transmit power is configured On receiving the PRACH-SI, in operation S930, BS transmits a RAR. RAR includes the other system information. In alternate embodiment, on receiving the random access preamble for SI, SI response can be broadcasted or provided in unicast manner. Scheduling control information indicating the SI-response can be masked with UE's ID (e.g., C-RNTI, RA-RNTI) or a pre-defined ID (e.g., SI-RNTI). Pre-defined ID can be different for different system information or system information set or service or UE type.

One or more SIs (i.e., SIBs) requested by UE are provided within some time window (i.e., SI Response Window) after sending the SI request. After sending the SI request, the UE listens to NR-PDCCH in SI Response Window for receiving the requested SIBs. If UE does not receive the requested SIBs within the SI Response Window then UE may retransmit the SI request. The length of SI response window is provided in minimum SI or essential SI.

Alternately, after sending the SI request, for receiving the requested SIB, UE monitors the SI window of requested SIB in one or more SI periods of that SIB. The scheduling information for other SI including SIB type, validity information, periodicity, SI-window information can be provided in minimum SI irrespective of whether Other SI is periodically broadcasted or provided on demand. In one embodiment, UE first checks for SI response in SI response window and if not received it monitors the SI window for receiving the requested SIs. In an embodiment in which SI response is broadcasted in SI window instead of SI response window or in RAR, RAR may still be transmitted to acknowledge the successful reception of SI request.

In an embodiment in which SI response is broadcasted in SI window instead of SI response window or in RAR, successful reception of SI request can be indicated by BS by including an indication in minimum SI.

In an embodiment, eNB may provide the requested system information for one or more cells. ENB may indicate the cells for which system information provided is applicable. As a result, the UE does not need to request for system information when the UE changes cell. After the cell change, if the UE does not have system information for the new cell then UE request for system information.

In another embodiment of the present disclosure, BS can indicate supported SI(s) in essential system information. UE can then request one or more of the supported SIs using the method (FIG. 9) explained earlier.

Figure 10:
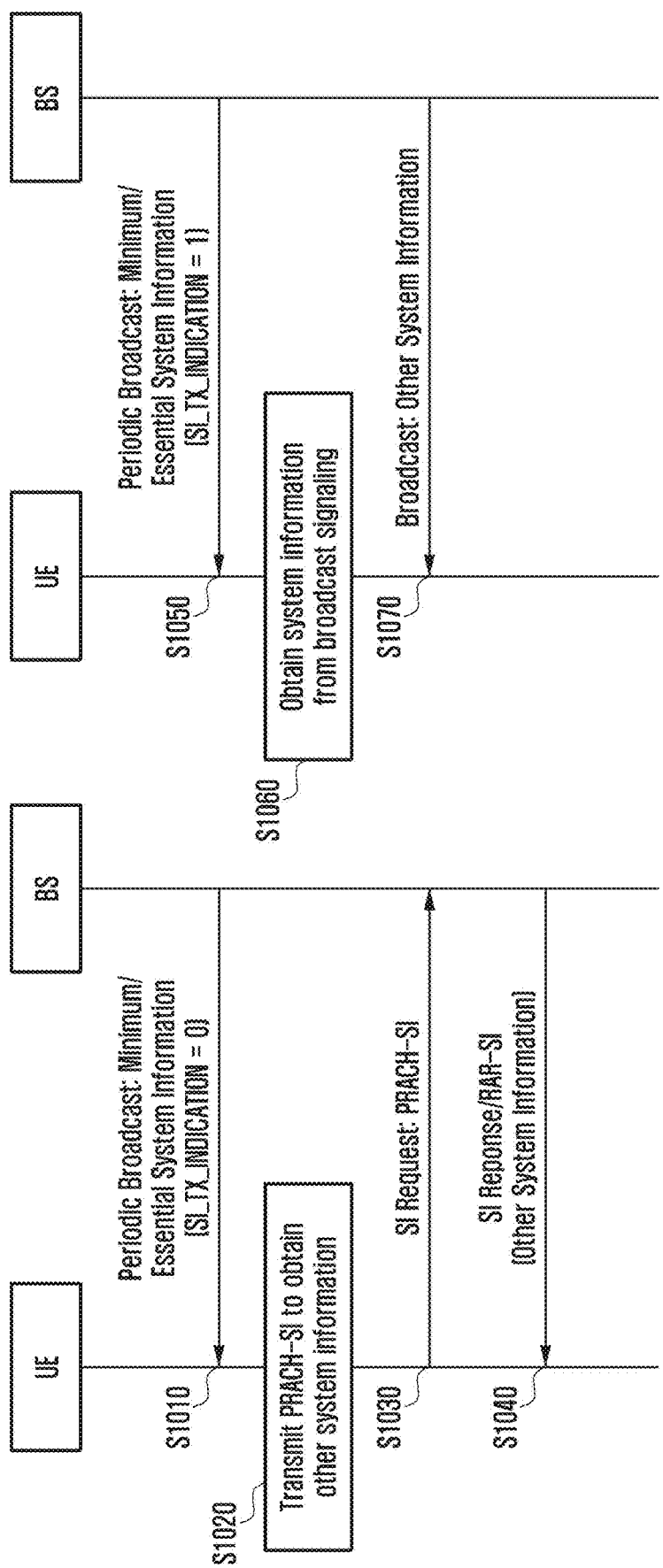
FIG. 10 illustrates a method for indicating in broadcasted essential system information whether other system information is broadcasted or not according to an embodiment of the present disclosure.

FIG. 10 illustrates a method for indicating in broadcasted essential system information whether other system information is broadcasted or not according to an embodiment of the present disclosure.

Referring to FIG. 10, in an embodiment of the present disclosure system information (other than essential system information) can also be broadcasted by the BS. BS may indicate in broadcasted essential system information whether other system information is broadcasted or not as shown in FIG. 10. If not broadcasted then UE can request using the method (FIG. 9) explained earlier.

In operation S1010, BS broadcasts minimum/essential system information (e.g., set SI_TX_Indication to zero) periodically. In operation S1020 and S1030, UE transmits PRACH-SI to obtain other system information as the SI_TX_Indication is set to zero. In operation S1040, BS transmits SI-Response/RAR-SI including other system information in response to the PRACH-SI.

In operation S1050, BS broadcasts minimum/essential system information (e.g., set SI_TX_Indication to one) periodically. In operation S1060 and S1070, UE obtains other system information from broadcast signaling as the SI_TX_Indication is set to one.

If broadcasted then UE read broadcasted system information to acquire the required system information. In case of heterogeneous network comprises of macro cell and small cells, macro cell may indicate that system information is broadcasted (e.g., set SI_TX_Indication to one) whereas small cells may indicate that system information is not broadcasted (e.g., set SI_TX_Indication to zero).

In an embodiment, SI_TX_Indication can be signaled for each SI or Set of SIs in minimum/essential system information.

In an embodiment, BS may provide the requested system information for one or more cells. ENB may indicate the cells for which system information provided in RAR-SI is applicable. As a result, the UE does not need to request for system information when the UE changes cell. After the cell change, if the UE does not have system information for the new cell then UE request for system information.

Figure 11:
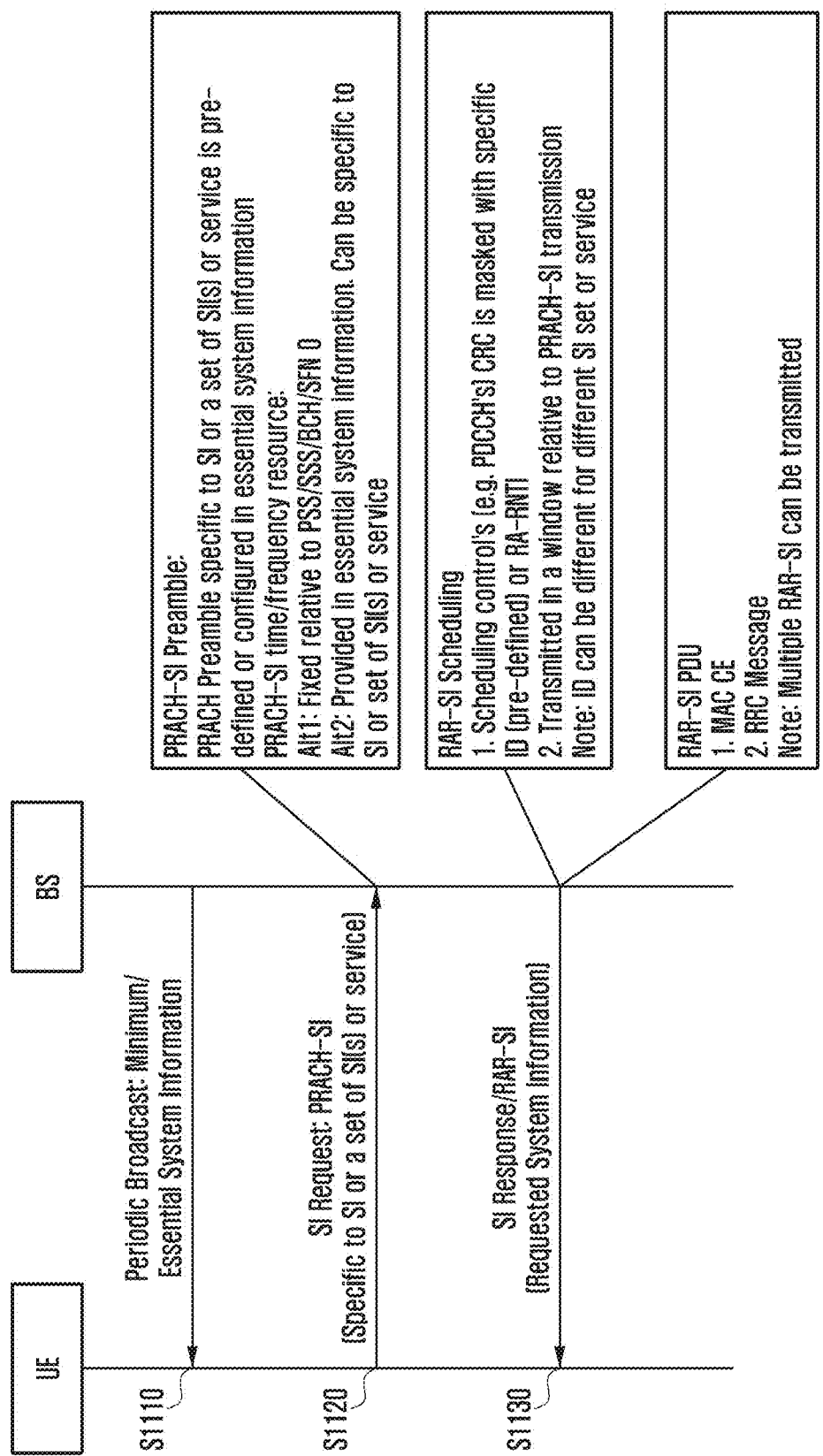
FIG. 11 illustrates a method for acquiring system information according to the other embodiment of the present disclosure.

FIG. 11 illustrates a method for acquiring system information according to the other embodiment of the present disclosure.

Referring to FIG. 11, in this method of the present disclosure the UE can acquire the system information as shown in FIG. 11. System information is categorized into two categories: The first category (also referred as minimum SI or essential SI) comprises of one or more System information which is broadcasted periodically by the cell and/or TRP. The second category (also referred as Other SI) comprises of one or more common system information which is provided to UE on demand or can be broadcasted periodically.

The first category comprises of essential system information such as information required for initial access to a cell, information required for acquiring the system information in second category. The second category of system information includes the system information not included in first category.

The first category (also referred as minimum SI or essential SI) of system information is periodically broadcasted by the cell and/or TRP. In operation S1110, UE acquires first category (also referred as minimum SI or essential SI) of system information from broadcasted information.

Network signals in first category of system information i.e. in Minimum SI or essential SI whether the system information in the second category is periodically broadcasted or provided on demand. For example, in case of heterogeneous network comprises of macro cell and small cells, macro cell may indicate that system information is broadcasted whereas small cells may indicate that system information is not broadcasted.

In another example, if there are several requests for system information provided on demand then network may start to broadcast the system information instead of providing on demand. Minimum SI or essential SI may include in indication which indicates that SIs of second category of system information are periodically broadcasted or are provided on demand. Alternately, minimum SI or essential SI may include a separate indication for each SI (e.g. SIB) or set of SIs (i.e., SIBs) wherein each indication indicates whether the associated SI or set of SIs are periodically broadcasted or are provided on demand.

Alternately, minimum SI or essential SI may include a separate indication for each SI message wherein each SI message carries one or more SIs (i.e., SIBs). The indication associated with an SI message indicates whether SIs associated with that SI message are broadcasted or provided on demand. Mapping of SI message to SIBs in included in minimum SI or essential SI. In order to acquire a SI of second category, UE first determines whether that SI is periodically broadcasted or provided on demand.

UE determines this based on indication included in first category (also referred as minimum SI or essential SI) of system information. If first category (also referred as minimum SI or essential SI) of system information indicates that SI which UE wants to acquire is periodically broadcasted (or not provided on demand) then UE acquires the SI from the periodic broadcast using the scheduling information included in first category (also referred as minimum SI or essential SI). If first category (also referred as minimum SI or essential SI) of system information indicates that SI which UE wants to acquire is not periodically broadcasted (or provided on demand) then UE sends request to BS to receive that SI.

In order to receive the other system information, in operation S1120, UE sends random access preamble (PRACH-SI). The random access preamble acts as SI request in this method. PRACH preambles and/or or PRACH opportunities for obtaining system information in RAR can be different from the PRACH preambles and/or PRACH opportunities for other purposes.

PRACH preambles and/or or PRACH opportunities for each SI (i.e., SIB) or set of SIs (i.e., SIBs) can be pre-defined or signaled in first category (also referred as minimum SI or essential SI). In one embodiment, PRACH-SI preamble for obtaining system information in RAR is pre-defined.

PRACH-SI preamble can be specific to system information or a set of system information or service of UE type. In this option, PRACH time/frequency resource can be one of following:

Alt1: Fixed relative to PSS/SSS/BCH/SFN 0

Alt2: Provided in essential system information. This can be specific to system information or a set of system information or service or UE type.

Alt3: Use PRACH time/frequency resource

In another embodiment, PRACH-SI preamble for obtaining system information in RAR is not pre-defined. UE can use any PRACH preamble. In this option, PRACH time/frequency resource is specific to PRACH-SI and can be one of the following:

Alt1: Fixed relative to PSS/SSS/BCH/SFN 0

Alt2: Provided in essential system information. This can be specific to system information or a set of system information or service or UE type.

UE determines the PRACH-SI Transmit Power using one of the following options:

Alt1: Open loop power control similar to PRACH

Alt2: Transmit at max power

Alt3: Transmit power is configured

On receiving the PRACH-SI, in operation S1130, BS transmits a RAR. RAR includes the requested system information. In alternate embodiment, on receiving the random access preamble for SI, SI response can be broadcasted or provided in unicast manner. Scheduling control information indicating the SI-response can be masked with UE's ID (e.g., C-RNTI, RA-RNTI) or a pre-defined ID (e.g., SI-RNTI). Pre-defined ID can be different for different system information or system information set or service or UE type.

One or more SIs (i.e. SIBs) requested by UE are provided within some time window (i.e. SI Response Window) after sending the SI request. After sending the SI request, the UE listens to NR-PDCCH in SI Response Window for receiving the requested SIBs. If UE does not receive the requested SIBs within the SI Response Window then UE may retransmit the SI request. The length of SI response window is provided in minimum SI or essential SI.

Alternately, after sending the SI request, for receiving the requested SIB, UE monitors the SI window of requested SIB in one or more SI periods of that SIB. The scheduling information for other SI including SIB type, validity information, periodicity, SI-window information can be provided in minimum SI irrespective of whether Other SI is periodically broadcasted or provided on demand. In one embodiment, UE first checks for SI response in SI response window and if not received it monitors the SI window for receiving the requested SIs.

In an embodiment in which SI response is broadcasted in SI window instead of SI response window or in RAR, RAR may still be transmitted to acknowledge the successful reception of SI request. In an embodiment in which SI response is broadcasted in SI window instead of SI response window or in RAR, successful reception of SI request can be indicated by BS by including an indication in minimum SI.

Figure 12:
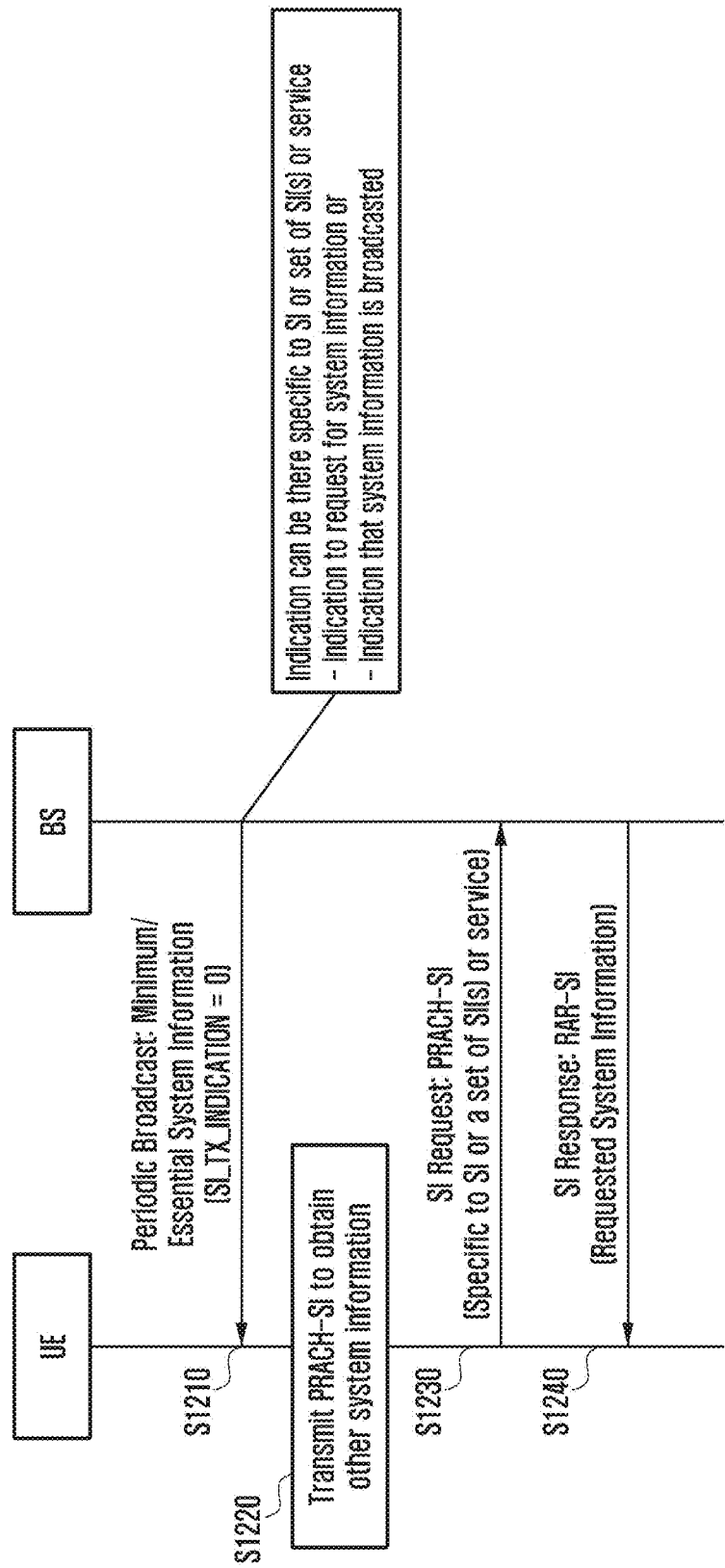
FIG. 12 illustrates a method for indicating in broadcasted essential system information whether other system information is broadcasted or not according to another embodiment of the present disclosure.

FIG. 12 illustrates a method for indicating in broadcasted essential system information whether other system information is broadcasted or not according to another embodiment of the present disclosure.

Referring to FIG. 12, in another embodiment of the present disclosure system information (other than essential system information) can also be broadcasted by the BS. BS may indicate in broadcasted essential system information whether other system information is broadcasted or not as shown in FIG. 12.

In operation S1210, BS broadcasts minimum/essential system information (e.g. set SI_TX_Indication to zero) periodically. In one embodiment, indication can be there specific to SI or set of Sis or service (indication to request for system information or indication that system information is broadcasted).

In operation S1220 and S1230, in response to the SI_TX_Indication, UE transmits SI Request/PRACH-SI to obtain other system information. SI Request/PRACH-SI is specific to SI or set of Sis or service. In operation S1240, BS transmits SI-Response/RAR-SI including requested system information in response to the PRACH-SI.

If system information is not broadcasted then UE can request using the method (FIG. 11) explained earlier. If broadcasted then UE read broadcasted system information to acquire the required system information. In case PRACH-SI information is broadcasted for on demand signaling i.e. for requesting system information, absence of this information in broadcasted essential system information may indicate that UE can read system information from broadcast signaling. In case of heterogeneous network comprises of macro cell and small cells, macro cell may indicate that system information is broadcasted (e.g., set SI_TX_Indication to one) whereas small cells may indicate that system information is not broadcasted (e.g., set SI_TX_Indication to zero).

In one embodiment, eNB may provide the requested system information for one or more cells. ENB may indicate the cells for which system information provided is applicable. As a result, the UE does not need to request for system information when the UE changes cell. After the cell change, if the UE does not have system information for the new cell then UE request for system information.

In another embodiment of the present disclosure, BS can also indicate supported SI(s) in essential system information. UE can then request one or more of the supported SIs using the method (FIG. 1) explained earlier.

FIG. 13 illustrates a method for acquiring system information according to the other embodiment of the present disclosure.

Referring to FIG. 13, in this method of the present disclosure the UE can acquire the system information as shown in FIG. 13. System information is categorized into two categories: The first category (also referred as minimum SI or essential SI) comprises of one or more System information which is broadcasted periodically by the cell and/or TRP. The second category (also referred as Other SI) comprises of one or more common system information which is provided to UE on demand or can be broadcasted periodically.

The first category comprises of essential system information such as information required for initial access to a cell, information required for acquiring the system information in second category. The second category of system information includes the system information not included in first category.

In this method BS broadcasts the first category (also referred as minimum SI or essential SI) of system information. In operation S1310, UE acquires first category (also referred as minimum SI or essential SI) of system information from broadcasted information.

Network signals in first category of system information, i.e., in Minimum SI or essential SI whether the system information in the second category, is periodically broadcasted or provided on demand. For example, in case of heterogeneous network comprises of macro cell and small cells, macro cell may indicate that system information is broadcasted whereas small cells may indicate that system information is not broadcasted.

In another example, if there are several requests for system information provided on demand then network may start to broadcast the system information instead of providing on demand. Minimum SI or essential SI may include an indication which indicates that all SIs of second category of system information are periodically broadcasted or are provided on demand. Alternately, minimum SI or essential SI may include a separate indication for each SI (e.g., SIB) or set of SIs (i.e. SIBs) wherein each indication indicates whether the associated SI or set of SIs are periodically broadcasted or are provided on demand.

Alternately, minimum SI or essential SI may include a separate indication for each SI message wherein each SI message carries one or more SIs (i.e., SIBs). The indication associated with an SI message indicates whether SIs associated with that SI message are broadcasted or provided on demand. Mapping of SI message to SIBs in included in minimum SI or essential SI. In order to acquire a SI of second category, UE first determines whether that SI is periodically broadcasted or provided on demand. UE determines this based on indication included in first category (also referred as minimum SI or essential SI) of system information. If first category (also referred as minimum SI or essential SI) of system information indicates that SI which UE wants to acquire is periodically broadcasted (or not provided on demand) then UE acquires the SI from the periodic broadcast using the scheduling information included in first category (also referred as minimum SI or essential SI).

If first category (also referred as minimum SI or essential SI) of system information indicates that SI which UE wants to acquire is not periodically broadcasted (or provided on demand) then UE sends request to BS to receive that SI, in operation S1320. Optionally, the BS may transmit the SI in a RAR message, in operation S1330.

In this method, BS also broadcasts the scheduling information about the other system information. However, other system information is not periodically broadcasted. BS broadcasts the other system information for defined time duration on receiving a trigger (e.g., PRACH-SI) from the UE, in operations S1340 and S1350. The trigger can be specific to a system information or set of system information or service or UE type. During the time when the system information is broadcasted after receiving a trigger from UE, BS may broadcasts an indication that it is broadcasting the system information. The indication can be specific to system information or a set of system information or service or UE type. This ensures that other UEs does not trigger PRACH-SI and reads the system information from broadcast. The trigger to broadcast can be transmitted at time slots configured by network. In one embodiment, trigger to broadcast can be transmitted at a time relative to location of particular system information. In operation S1360, the BS broadcasts and the UE acquires essential SI. In operation S1370, the BS broadcasts and the UE acquires the SI, a location of SI may be indicated in the essential SI.

Figure 14:
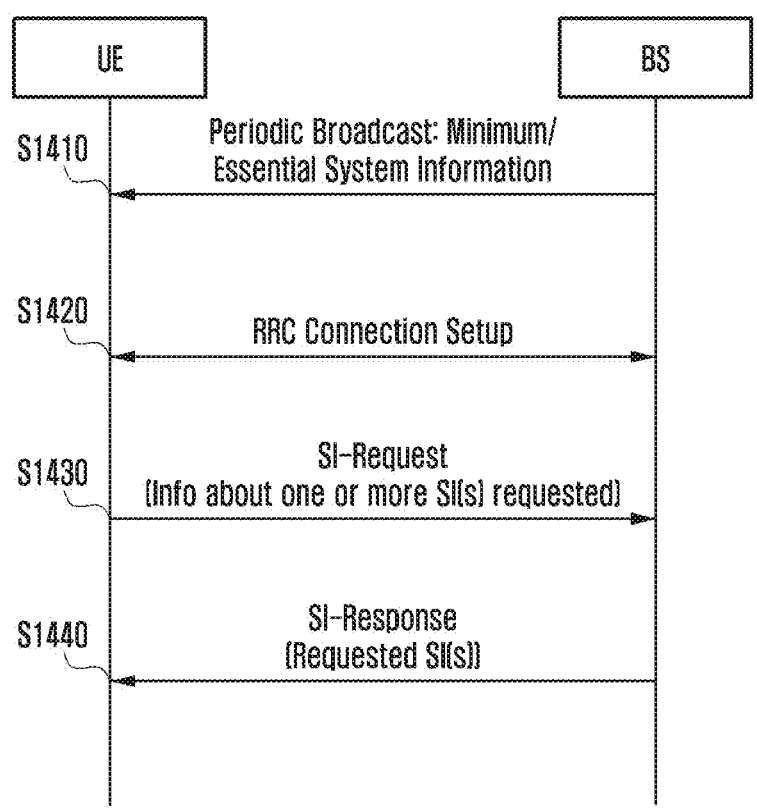
FIG. 14 illustrates a method for acquiring system information according to the other embodiment of the present disclosure.

FIG. 14 illustrates a method for acquiring system information according to the other embodiment of the present disclosure. In this method of the present disclosure, the UE can acquire the system information as shown in FIG. 14.

Referring to FIG. 14, in this method of the present disclosure the UE can acquire the system information as shown in FIG. 14. System information is categorized into two categories: The first category (also referred as minimum SI or essential SI) comprises of one or more System information which is broadcasted periodically by the cell and/or TRP. The second category (also referred as Other SI) comprises of one or more common system information which is provided to UE on demand or can be broadcasted periodically.

The first category comprises of essential system information such as information required for initial access to a cell, information required for acquiring the system information in second category. The second category of system information includes the system information not included in first category. In this method BS broadcasts the first category (also referred as minimum SI or essential SI) of system information. In operation S1410, UE acquires first category (also referred as minimum SI or essential SI) of system information from broadcasted information.

Network signals in first category of system information i.e. in Minimum SI or essential SI whether the system information in the second category is periodically broadcasted or provided on demand. For example, in case of heterogeneous network comprises of macro cell and small cells, macro cell may indicate that system information is broadcasted whereas small cells may indicate that system information is not broadcasted. In another example, if there are several requests for system information provided on demand then network may start to broadcast the system information instead of providing on demand.

Minimum SI or essential SI may include in indication which indicates that SIs of second category of system information are periodically broadcasted or are provided on demand. Alternately, minimum SI or essential SI may include a separate indication for each SI (e.g., SIB) or set of SIs (i.e., SIBs) wherein each indication indicates whether the associated SI or set of SIs are periodically broadcasted or are provided on demand. Alternately, minimum SI or essential SI may include a separate indication for each SI message wherein each SI message carries one or more SIs (i.e., SIBs). The indication associated with an SI message indicates whether SIs associated with that SI message are broadcasted or provided on demand. Mapping of SI message to SIBs in included in minimum SI or essential SI.

In order to acquire a SI of second category, UE first determines whether that SI is periodically broadcasted or provided on demand. UE determines this based on indication included in first category (also referred as minimum SI or essential SI) of system information. If first category (also referred as minimum SI or essential SI) of system information indicates that SI which UE wants to acquire is periodically broadcasted (or not provided on demand) then UE acquires the SI from the periodic broadcast using the scheduling information included in first category (also referred as minimum SI or essential SI). If first category (also referred as minimum SI or essential SI) of system information indicates that SI which UE wants to acquire is not periodically broadcasted (or provided on demand) then UE sends request to BS to receive that SI.

To acquire the one or more SIs provided on demand, in operation S1420, UE performs RRC connection setup procedure if UE is in RRC idle state. In RRC connected state, in operation S1430, UE sends SI request message. SI request message indicates one or more system information which UE needs or indicates one or more set of system information which UE needs or indicates service (e.g., eMBB, MTC, URLL, etc.) for which UE needs system information or UE type. UE may transmit its UE ID (i.e., S-TMSI, C-RNTI, RA-RNTI, etc.) along with SI request message.

In response to SI request, in operation S1440, BS transmits SI-response wherein the SI-response includes the requested system information. Scheduling control information indicating the SI-response can be masked with UE's ID (e.g., C-RNTI, RA-RNTI) or a pre-defined ID (e.g., SI-RNTI). Pre-defined ID can be different for different system information or system information set or service or UE type.

UE can indicate the needed system information in SI-Request using the mechanisms explained in method 1.

In one embodiment SI request can be included in RRC connection request and SI response can be included RRC connection response. In another embodiment, BS can determine the system information needed by UE based on service supported by UE or based on service for which UE has requested connection and provide the system information to UE using dedicated signaling.

In an embodiment, eNB may provide the requested system information for one or more cells. ENB may indicate the cells for which system information provided in SI response is applicable. As a result, the UE does not need to request for system information when the UE changes cell. After the cell change, if the UE does not have system information for the new cell then UE request for system.

In another embodiment, a cell may broadcast some of the SIs in the first category of system information. The remaining SIs in the first category of system information of a cell can be broadcasted or provided on demand by another cell. In the request, UE may include information (e.g., cell ID, frequency, cell index, etc.) about the cell for which it is requesting SI.

Figure 15:
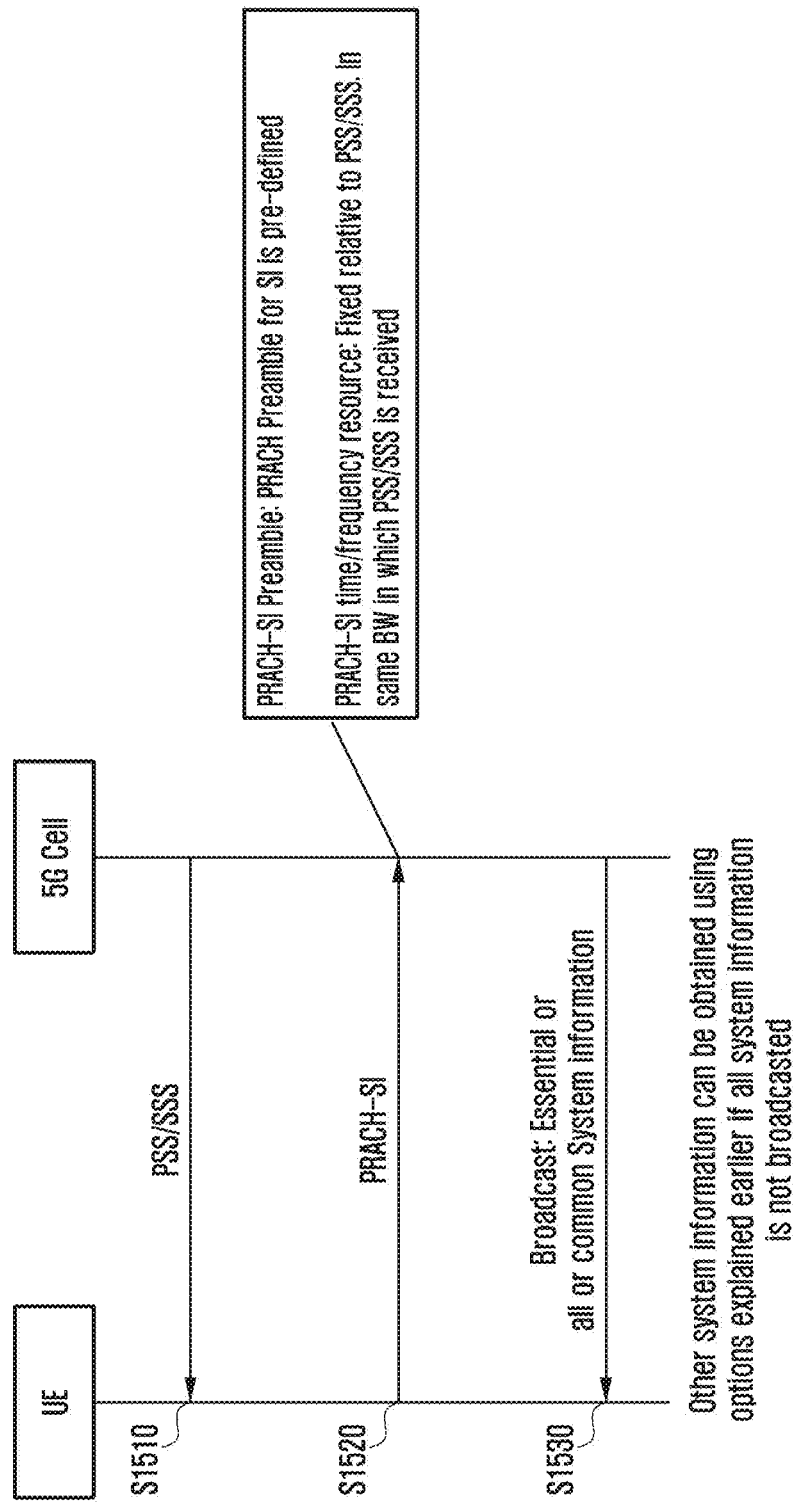
FIG. 15 illustrates a method for acquiring system information according to the other embodiment of the present disclosure.

FIG. 15 illustrates a method for acquiring system information according to the other embodiment of the present disclosure.

Referring to FIG. 15, in this method of the present disclosure the UE can acquire the system information as shown in FIG. 15. In operation S1510, BS (or 5G Cell) broadcasts the synchronization signals, i.e., PSS/SSS. No system information is broadcasted periodically.

In order to request the SI, in operation S1520, UE transmits the PRACH-SI preamble. The PRACH-SI preamble can be pre-defined. The time and frequency resource for PRACH-SI transmission can be defined relative to PSS/SSS. On receiving the PRACH-SI preamble, in operation S1530, BS may broadcast minimum SI or the system information or the common system information. If any system information is not broadcasted then UE may acquire using the methods explained earlier.

In the methods explained earlier, UE requests for system information on demand, in the present disclosure network can configure the period at which UE can request. This can reduce too many requests.

If the response is broadcasted then it can be in a time window relative to time in which request is sent. In the methods explained earlier UE requests for system information on demand, UE may monitor broadcast transmission for a defined time duration to receive the desired system information before requesting the desired system information.

Figure 16:
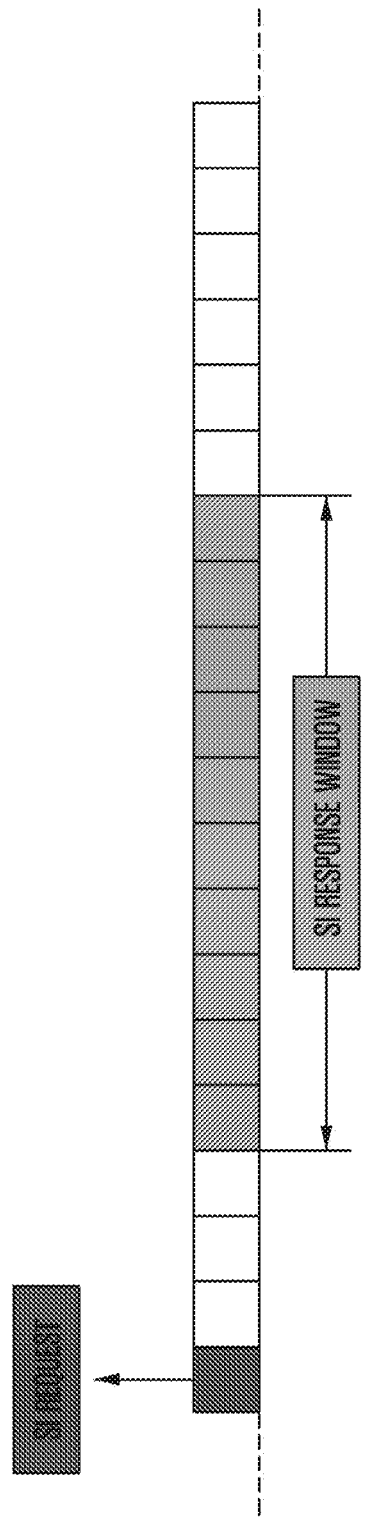
FIG. 16 illustrates a method for providing system information within a time window according to an embodiment of the present disclosure.

FIG. 16 illustrates a method for providing system information within a time window according to an embodiment of the present disclosure.

Referring to FIG. 16, one or more SIBs requested by UE are provided within some time window (i.e., SI Response Window) after sending the SI request. After sending the SI request, the UE listens to NR-PDCCH in SI Response Window for receiving the requested SIBs. If UE does not receive the requested SIBs within the SI Response Window then UE may retransmit the SI request.

In an embodiment, the length of SI response window is provided in mobile subscriber identity (MSI) (essential system information). In another embodiment, acknowledgment for SI request may be performed as UE checks for RAR after sending SI request or UE checks for indication in MSI.

Figure 17:
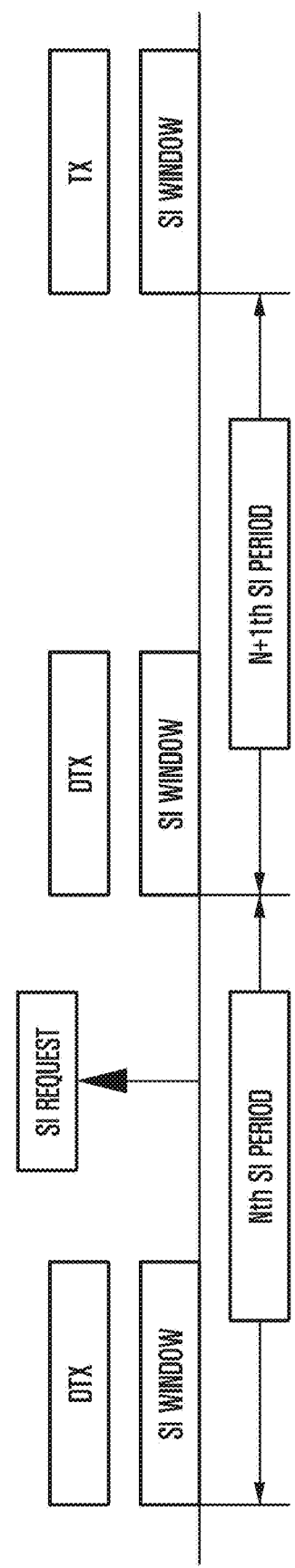
FIG. 17 illustrates a method for providing system information by monitoring a time window in one or more periods according to an embodiment of the present disclosure.

FIG. 17 illustrates a method for providing system information by monitoring a time window in one or more periods according to an embodiment of the present disclosure.

Referring to FIG. 17, after sending the SI request, for receiving the requested SIB, UE monitors the SI window of requested SIB in one or more SI periods of that SIB. The scheduling information for other SI includes SIB type, validity information, periodicity, SI-window information in minimum SI irrespective of whether Other SI is periodically broadcasted or provided on demand.

In one embodiment, acknowledgment for SI request may be performed as UE checks for RAR after sending SI request or UE checks for indication in MSI. Minimization of SI Re-Acquisition There can be several small cells in coverage of macro cell. Currently system information is cell specific. Currently each cell (small cell as well as macro cell) transmits their own system information. In an embodiment of the present disclosure, a first cell (e.g., Macro cell) provides information about one or more second cells (e.g., small cells).

Several system information parameters may have the same values across many cells. So in an embodiment system information parameters can be categorized into cell specific information and non-cell specific information. Non cell specific information i.e. system information having common values across one or more second cells (e.g., small cells) in can be signaled using broadcasted or dedicated signaling by first cell (e.g., macro cell) or can be provided on demand. Cell specific information is signaled by each cell.

In an embodiment, a first cell may signal several sets of system information using broadcasted or dedicated signaling. In one embodiment, each of these sets may be indexed in the order in which they are signaled by first cell. The second cell may indicate (using broadcast or dedicated signaling) which system information set amongst the multiple sets signaled by first cell are applicable to this cell. In alternate embodiment, first cell may indicate list of cell ids of cells along with each set, wherein cell id identifies the cell for which this set is applicable.

In embodiment, cell specific system information can be obtained as follows:

Option 1: UE Obtains from Macro Cell

1a: Macro cell broadcasts these information in broadcast signaling.

1b: Macro cell provide these information in dedicated signaling.

Macro cell may indicate using broadcast signaling whether it provides such information.

Macro cell may also indicate whether it provides such information in dedicated signaling if such information is not broadcasted.

On demand signaling as explained earlier can also be used to request information from Macro cell.

Option 2: UE Obtains Directly from Cell

If Macro cell does not provide the information then UE obtains directly from cell.

Small cell may broadcast these information.

On demand signaling as explained earlier can be used to request information from cell.

In the methods explained earlier, the system information received from periodic broadcast or using on demand SI request procedure explained earlier from a cell can be used for one or more cells. The cells for which received system information can be used can be indicated by the cell from which system information is obtained either from periodic broadcast or using on demand SI request procedure explained earlier. UE may also receive system information from multiple cells from periodic broadcast or using on demand SI request procedure. As a result, the UE does not need to request or reacquire the system information when the UE changes cell. After the cell change, if the UE does not have system information for the new cell then UE reacquire or request for system information.

Figure 18:
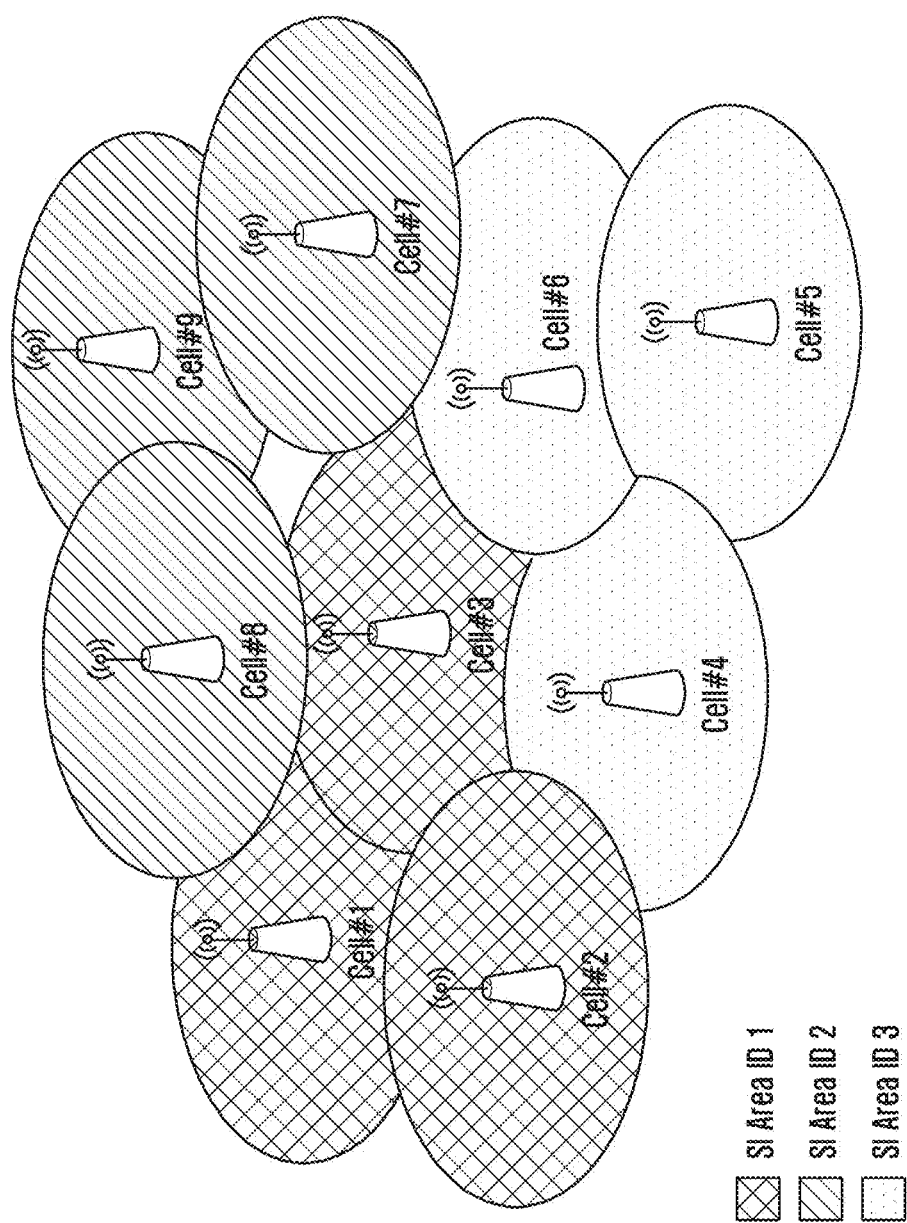
FIG. 18 illustrates a method for configuring system information area ID according to an embodiment of the present disclosure.

FIG. 18 illustrates a method for configuring system information area ID according to an embodiment of the present disclosure.

Referring to FIG. 18, in an alternate embodiment, system information area concept can be defined. System information area refers to an area covering one or more cells or transmits point or transmit/receive point wherein the system information used is same. System information area can be identified by a system information area identifier. Cell or transmit point or transmit/receive point broadcasts the system info area identifier.

When a UE moves from one cell to another, it checks the SI Area ID. If there is change in SI Area ID then UE reacquires the system information. For example, as shown in FIG. 18, if UE moves from cell 1 to cell 3, it does not need to reacquire the system information. If UE moves from cell 1 to cell 8 then it needs to reacquire the system information.

In an embodiment of the present disclosure system information area (or SI Area ID) can be different for different SIs (or SIBs). In an embodiment of the present disclosure system information area (or SI area ID) can be different for different sets of SIs (SIBs). In an embodiment of the present disclosure one system information area (or SI Area ID) can be there for SIs (or SIBs). In an embodiment of the present disclosure some SIs are cell specific and SI area ID is not associated with them.

In an embodiment of the present disclosure within an SI area, different versions of associated SI can be used. Each of these versions is identified by an index or value tag. Let's say SI areas for SIB X are as shown in FIG. 16. Cell 1, Cell 2 and Cell 3 use a configuration of SIBx. Cell 1, Cell 2 and Cell 3 broadcasts that for SIBx, SI area ID is 1 and index/value tag is P. If cell 1, cell 2 and cell 3 wants to use a different configuration for SIBx, then they broadcast that for SIBx, SI area ID is 1 and index/value tag is Q. Within the same SI area if there is change in index or value tag, and UE does not have a valid SI configuration corresponding to the new index/valuetag of that SI area, UE reacquires the corresponding SI. The SI configuration identified by index/valuetag is valid in SI area in which it is obtained. It is not valid in another SI area. The scope of validity of index/valuetag is within the SI area. For example, the configuration of SIBx identified by index/value tag P in SI area ID 1 is not same as configuration of SIBx identified by index/value tag P in SI area ID 2 or SI area ID 3. It is to be noted that in prior art the scope of valueTag is one cell. In this method of the present disclosure scope of valueTag is SI area i.e. multiple cells.

Figure 19:
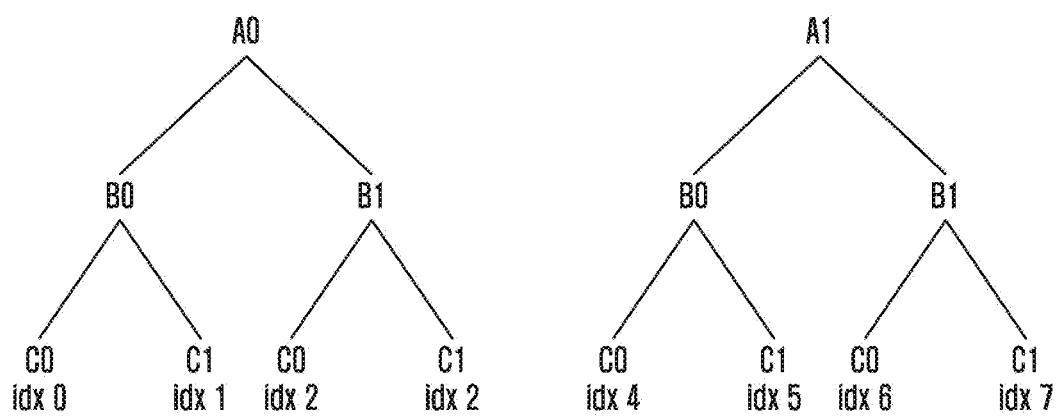
FIG. 19 illustrates a method for indexing system information parameters according to an embodiment of the present disclosure.

FIG. 19 illustrates a method for indexing system information parameters according to an embodiment of the present disclosure.

Referring to FIG. 19, in an embodiment of the present disclosure, BS may support multiple configuration sets of values for system information parameters. For example, let's say SI comprises of parameters P, Q and R. Let's says parameter P can have values P0, P1. Parameter Q can have values Q0, Q1, Q2. Parameter R can have values R0, R1. There can be 2*3*2=12 possible configurations for these parameters wherein each configuration has at least one parameter's value different from other configuration. Each of these configurations is given an index. Instead of signaling (either in broadcast or dedicated signaling) the parameters and there values, index can be signaled. For example configuration 0: P→P0, Q→Q0, R→R0; Configuration 1: P→P0, Q→Q1, R→R0; and so on.

For SI having parameters A, B and C possible configuration sets are shown in FIG. 19. In the example, Parameter A can have two possible values A0 and A1. Parameter B can have two possible values B0 and B1. Parameter C can have two possible values C0 and C1. Note that each parameter can have different number of values. Each Path from top to bottom in tree (FIG. 16) is one valid configuration. These configurations can be sequentially numbered as shown in FIG. 16. 8 possible configurations are as follows:

Idx0: {A0, B0, C0}; Idx1: {A0, B0, C1}; Idx2: {A0, B1, C0}; Idx3: {A0, B1, C1}; Idx4: {A1, B0, C0}; Idx5: {A1, B0, C1}; Idx6: {A1, B1, C0}; Idx7: {A1, B1, C1}; idx={index of value of parameter A*(number of values of B*number of values of C)}+{index of value of parameter B*(number of values of C)}+index of value of parameter C. In order to allow skipping of a parameter in a configuration, skipping can be considered as additional value. For example, if parameter A can be skipped then Parameter A can have three values A0, A1, skip. A0 value has index 0, A1 value has index 1 and skip value has index 2.

If a possible value of each SI parameter is known, and then given the index, configuration can be known corresponding to that index. SI can be categorized into various parts/groups etc. wherein each part or group has his own configuration indexes. Each SI part or SI group can have several configurations and each configuration can be indicated using index as illustrated above. For example, let's say there are two SI parts, SI part 1 and SI part 2. SI part 1 has three parameters A, B, C. SI part has two parameters P, Q. SI part 1 configuration and SI part 2 configuration can be indicated independently using their own configuration indexes.

Configuration index can be broadcasted or signaled using dedicated signaling. If SI is requested on demand then configuration index can be signaled instead of full configuration in response. Alternately, configuration index for SI can be broadcasted. If UE cannot know configuration based on broadcasted index then it can request BS/eNB/TRP to provide configuration corresponding to index by sending the index in SI request. UE may not know configuration based on index if it does not know the values of parameters which are supported in Cell/BS/eNB/TRP. For example, parameter A can have values A0, A1, A2, and A3. But values A0, A1 may be supported in cell 1 whereas values A2, A3, A1 may be supported in another cell 2. If UE cannot know configuration based on broadcasted index then it can request BS/eNB/TRP to provide values of parameters of SI supported in Cell/BS/eNB/TRP in SI request. Once the values of parameters of SI supported in Cell/BS/eNB/TRP are known, UE can determine the configuration corresponding to broadcast index. SI request/response can be signaled using method 1 to 9 explained earlier.

The supported values of parameters of SI can be same throughout the network or can be specific to cell/TRP. The supported values of parameters of SI part/group can be same throughout the network and for other SI part/group it can be specific to cell/TRP.

In another embodiment, instead of indexing as shown in FIG. 19, network or cell/TRP/eNB can maintain several configurations for SI or SI part or SI group and assign a distinct index/identifier to each configuration. Network indicates the index/identifier in broadcast signaling for each SI or SI part/group. UE first receives the broadcast signaling and gets the index/identifier for a SI or SI part/group. If UE does not have configuration corresponding to index/identifier UE request the configuration corresponding to index/identifier using on demand signaling explained earlier. Index/identifier can be included in request. If UE has valid configuration corresponding to index/identifier then UE uses it and does not need to request. Note that in one embodiment, this index/identifier can be valid across cells or TRPs or eNBs for an SI or SI part of SI group. In another embodiment, this index/identifier can be valid across TRPs of same cell for an SI or SI part of SI group. Whether the index/identifier for an SI or SI part or SI group is valid across cells or TRPs or eNBs etc. can be pre-defined or indicated in broadcast signaling. UE can store the configuration corresponding to an index/identifier for a defined life time.

Figure 20:
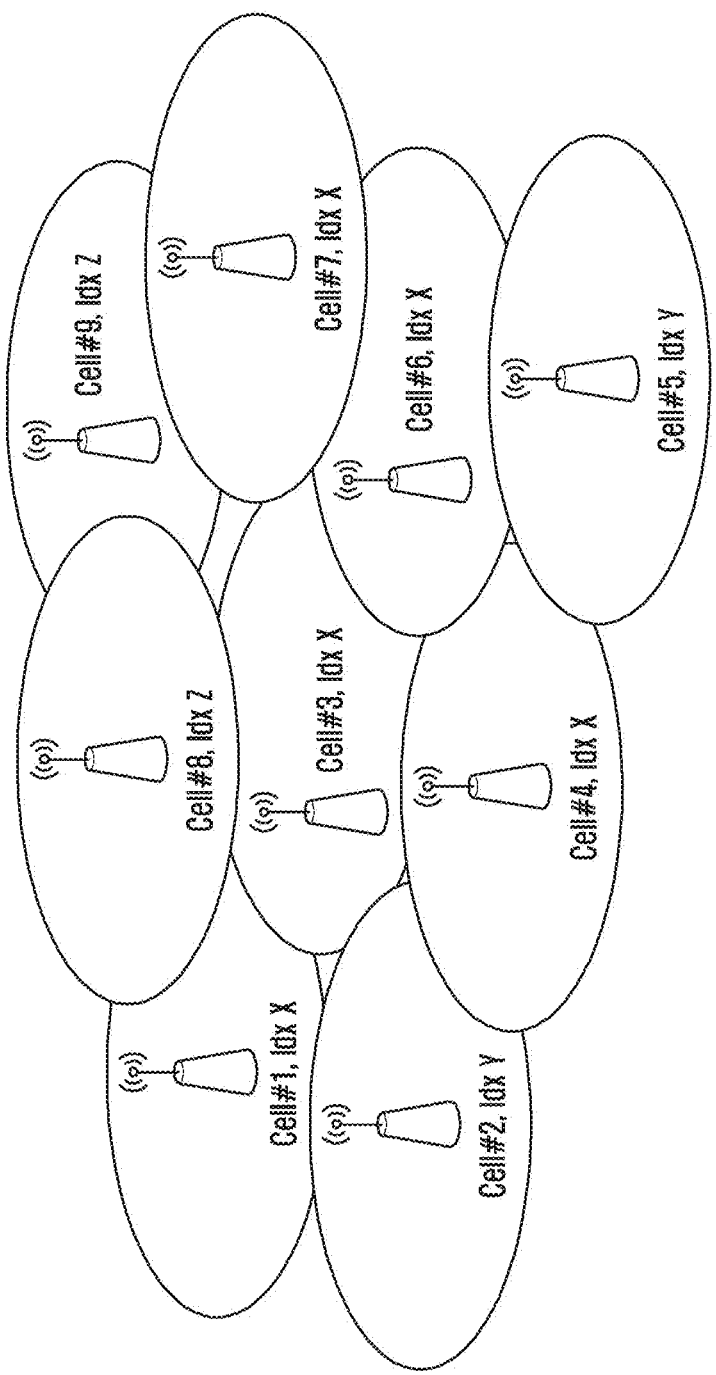
FIG. 20 illustrates a method for configuring a system information configuration identification (ID) according to an embodiment of the present disclosure.

FIG. 20 illustrates a method for configuring system information configuration ID according to an embodiment of the present disclosure.

Referring to FIG. 20, when a UE moves from one cell to another cell, if there is change in index for a SIB and it does not have the configuration corresponding to index used in that cell, UE reacquires the SI otherwise not. Let's say for SIB X network uses three configurations identified by index X, Y, Z as shown in FIG. 18. If UE moves from cell 1 to cell 3, it does not needs to reacquire SIBx, as both cells uses same configuration. If UE moves from cell 1 to cell 2, it has to reacquire SIBx if it does not have a stored configuration corresponding to index x. Unlike the previous method, scope of index is entire network instead of SI area. The index can also be named as valueTag wherein the scope of valueTag is entire network instead of one cell.

System Information Update Procedure

UE can be notified about the system information update in one of the following ways:

Option 1

System information is categorized into various parts/groups/sets. BS broadcasts System Information Set(s) supported. BS also broadcasts ValueTag/identifier/configuration index for each supported system information set/part/group. Change in value tag/identifier/configuration index corresponding to a system information set indicates that system information set/group/part is updated. Additionally BS may also broadcast change notification for each system information of a service. OR BS broadcasts Service(s) supported. BS also broadcasts valueTag/identifier/configuration index for each supported service. Change in value tag/identifier/configuration index corresponding to service indicates that system information for that service is updated. Additionally BS may also broadcast change notification for each system information of a service.

Option 2

Change notification for each supported system information set or service is indicated in paging message. ValueTag/identifier/configuration index associated with updated system information can also be indicated in paging message.

Option 3

Change notification can be indicated using a SI Update message

Each SI update message can indicate notification for a group of SI(s). RNTI specific to group can be used to schedule the SI update message.

SI update message can be RRC message or DCI signaled in PDCCH.

Obtaining Updated Information

UE request updated system information set or service specific system information if the update indication is received using the methods explained earlier (i.e. broadcast or on demand). If the system information set changed is part of broadcasted information then UE obtains updated system information from broadcast. If the system information set changed is part of on demand system information then UE obtains updated system information using on demand signaling.

Alt: network (NW) may broadcast the updated information for defined time period. UE reads broadcasted information.

In an embodiment, ValueTag/identifier/configuration index may indicate that system information set/group/part is changed. In another embodiment, ValueTag/identifier/configuration index may identify a particular configuration of system information set/group/part. When a network signals a system information set/group/part identifier and UE does not have configuration corresponding to this identifier then UE updates the system information. In one embodiment, each of this SI Set/part/group may contain same parameters but may be valid in different area.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for receiving system information (SI) by a user equipment (UE) in a wireless communication system, the method comprising:
   receiving, from a base station (BS) in the wireless communication system, first SI broadcasted periodically, the first SI including information indicating whether SI messages for second SI are to be transmitted on demand;
   transmitting, to the BS, a physical random access channel (PRACH) preamble;
   receiving, from the BS, a random access response (RAR) message as a response to the PRACH preamble, the RAR message including an uplink (UL) grant for allocating a UL resource;
   based on the information indicating that the SI messages for the second SI are to be transmitted on demand, transmitting, to the BS, an SI request message requesting an SI message for the second SI on the UL resource; and
   receiving, from the BS, the requested SI message for the second SI as a response to the SI request message.

2. The method of claim 1,
   wherein the requested SI message is provided within a time window after transmitting the SI request message, and
   wherein a length of the time window is included in the first SI.

3. The method of claim 1, further comprising:
   monitoring an SI window of an SI-block (SIB) for the SI message in one or more SI periods of the SIB.

4. The method of claim 1, wherein the first SI includes an SI configuration identifier (ID) corresponding to a set of SI used in a cell.

5. The method of claim 1, further comprising:
   receiving, from the BS, an SI area identifier (ID) corresponding to a set of cells having a same SI configuration.

6. A method for transmitting system information (SI) by a base station (BS) in a wireless communication system, the method comprising:
   transmitting, to a user equipment (UE) in the wireless communication system, first SI by broadcasting the first SI periodically, the first SI including information indicating whether SI messages for second SI are to be transmitted on demand;
   receiving, from the UE, a physical random access channel (PRACH) preamble;
   transmitting, to the UE, a random access response (RAR) message as a response to the PRACH preamble, the RAR message including an uplink (UL) grant for allocating a UL resource;
   receiving, from the UE, an SI request message requesting an SI message for the second SI on the UL resource; and
   transmitting, to the UE, the requested SI message for the second SI as a response to the SI request message.

7. The method of claim 6,
   wherein the requested SI message is provided within a time window after the SI request message is transmitted from the UE, and
   wherein a length of the time window is included in the first SI.

8. The method of claim 6, wherein the first SI includes an SI configuration identifier (ID) corresponding to a set of SI used in a cell.

9. The method of claim 1, further comprising:
transmitting, to the UE, an SI area identifier (ID) corresponding to a set of cells having a same SI configuration.

10. A user equipment (UE) for receiving system information (SI) in a wireless communication system, the UE comprising:
a transceiver; and
a controller configured to:
receive, from a base station (BS) via the transceiver, first SI broadcasted periodically, the first SI including information indicating whether SI messages for second SI are to be transmitted on demand,
transmit, to the BS via the transceiver, a physical random access channel (PRACH) preamble,
receive, from the BS via the transceiver, a random access response (RAR) message as a response to the PRACH preamble, the RAR message including an uplink (UL) grant for allocating a UL resource,
if the information indicates that the SI messages for the second SI are to be transmitted on demand, transmit, to the BS via the transceiver, an SI request message on the UL resource, to request an SI message for the second SI, and
receive, from the BS, the requested SI message for the second SI as a response to the SI request message.

11. The UE of claim 10,
wherein the requested SI message is provided within a time window after transmitting the SI request message, and
wherein a length of the time window is included in the first SI.

12. The UE of claim 10, wherein the controller is further configured to:
monitor an SI window of an SI-block (SIB) for the SI message in one or more SI periods of the SIB.

13. The UE of claim 10, wherein the first SI includes an SI configuration identifier (ID) corresponding to a set of SI used in a cell.

14. The UE of claim 10, wherein the controller is further configured to:
receive, from the BS via the transceiver, an SI area identifier (ID) corresponding to a set of cells having a same SI configuration.

15. A base station (BS) for transmitting system information (SI) in a wireless communication system, the BS comprising:
a transceiver; and
a controller configured to:
transmit, to a user equipment (UE) via the transceiver, first SI by broadcasting the first SI periodically, the first SI including information indicating whether SI messages for second SI are to be transmitted on demand,
receive, from the UE via the transceiver, a physical random access channel (PRACH) preamble,
transmit, to the UE via the transceiver, a random access response (RAR) message as a response to the PRACH preamble, the RAR message including an uplink (UL) grant for allocating a UL resource,
receive, from the UE via the transceiver, an SI request message requesting an SI message for the second SI on the UL resource, and
transmit, to the UE, the requested SI message for the second SI as a response to the SI request message.

16. The BS of claim 15,
wherein the requested SI message is provided within a time window after the SI request message is transmitted from the UE, and
wherein a length of the time window is included in the first SI.

17. The BS of claim 15, wherein the first SI includes an SI configuration identifier (ID) corresponding to a set of SI used in a cell.

18. The BS of claim 15, wherein the controller is further configured to:
transmit, to the UE via the transceiver, an SI area identifier (ID) corresponding to a set of cells having a same SI configuration.

* * * * *